(12) United States Patent
Vetrovec

(10) Patent No.: US 7,854,118 B2
(45) Date of Patent: *Dec. 21, 2010

(54) SUPERCHARGED INTERNAL COMBUSTION ENGINE

(76) Inventor: Jan Vetrovec, 8276 Eagle Rd., Larkspur, CO (US) 80118

( * ) Notice: Subject to any disclaimer, the term of this patent is extended or adjusted under 35 U.S.C. 154(b) by 1149 days.

This patent is subject to a terminal disclaimer.

(21) Appl. No.: 11/443,424

(22) Filed: May 29, 2006

(65) Prior Publication Data

US 2009/0320466 A1    Dec. 31, 2009

Related U.S. Application Data

(63) Continuation of application No. 11/028,244, filed on Jan. 2, 2005, now Pat. No. 7,076,952.

(51) Int. Cl.
F02B 33/44    (2006.01)

(52) U.S. Cl. .............. 60/605.1; 123/559.1; 123/565

(58) Field of Classification Search ............ 60/605.1, 60/605.2; 123/559.1, 565
See application file for complete search history.

(56) References Cited

U.S. PATENT DOCUMENTS

| 1,746,309 A | 2/1930 | Herier |
| 1,765,278 A | 6/1930 | Lavergne |
| 2,297,910 A | 10/1942 | Neuland |
| 2,965,083 A | 12/1960 | Percival |
| 2,983,267 A | 5/1961 | Percival |
| 3,020,901 A | 2/1962 | Cook |
| 3,257,996 A | 6/1966 | Henrikson |
| 3,996,748 A | 12/1976 | Melchior |
| 4,418,532 A | 12/1983 | Momose et al. |
| 4,461,251 A | 7/1984 | Sheaffer |
| 4,538,584 A | 9/1985 | Schier et al. |
| 4,840,164 A | 6/1989 | Parsosn |
| 5,299,547 A | 4/1994 | Michimasa |
| 5,425,239 A | 6/1995 | Gobert |
| 5,529,549 A | 6/1996 | Moyer |

(Continued)

FOREIGN PATENT DOCUMENTS

JP    5756623 A    4/1982

(Continued)

OTHER PUBLICATIONS

McGraw-Hill Dictionary of Scientific and Technical Terms, 6th ed., p. 2069, McGraw-Hill Companies, Inc., New York, 2003.

(Continued)

*Primary Examiner*—Hoang M Nguyen

(57) ABSTRACT

A supercharged internal combustion engine system wherein the supercharger assembly includes an ejector pump driven by high-pressure air for pumping intake air into engine combustion chamber. Included are means for sensing engine power demand and controlling the supercharging action. A compressor and an air tank for providing high-pressure air for driving the ejector pump are also disclosed. During periods of natural aspiration the ejector pump can be by-passed to reduce flow impedance. The ejector pump can use a driving nozzle with a fixed throat or a variable throat, or a lobed nozzle. Effective supercharging is achieved even at low engine speeds. One of the objects of the invention is to obtain more power from small displacement ICE and thus providing automotive vehicles with sufficient acceleration in addition to good fuel economy.

50 Claims, 14 Drawing Sheets

U.S. PATENT DOCUMENTS

| | | | |
|---|---|---|---|
| 5,611,203 | A | 3/1997 | Henderson et al. |
| 5,611,204 | A | 3/1997 | Radovanovic et al. |
| 5,974,802 | A | 11/1999 | Blake |
| 5,975,035 | A | 11/1999 | McWhorter |
| 6,082,341 | A | 7/2000 | Arai et al. |
| 6,267,106 | B1 | 7/2001 | Feucht |
| 6,502,397 | B1 | 1/2003 | Lundqvist |
| 6,968,831 | B2 | 11/2005 | Kim et al. |
| 7,076,952 | B1 * | 7/2006 | Vetrovec .................. 60/605.1 |
| 2006/0168958 | A1 | 8/2006 | Vetrovec |

FOREIGN PATENT DOCUMENTS

| | | |
|---|---|---|
| JP | 57059022 A | 4/1982 |
| JP | 57210154 A | 12/1982 |
| WO | WO/2006/076167 | 7/2006 |

OTHER PUBLICATIONS

R.H. Perry and C.H. Chilton, "Chemical Engineer's Handbook," pp. 6-29 to 6-32, McGraw-Hill Book Co., Inc., New York, 1973.

G.L. Weissler and R.W. Carlson, "Vacuum Physics and Technology," Ch. 4.3.5 "Ejectors," pp. 136-138, Academic Press, New York, 1979.

"Jet Pump Technical Data: Pumping Gasses," Data bulletin 1300, Section 1000, issued Mar. 1979 by Penberthy-Houdaille, Prophetstown, IL.

S. Skebe et al., "Param. Effects on Mixer-Ejector Pumping Perf.," paper No. AIAA-88-0188, American Inst. of Aero. and Astro., Washington, DC, 1988.

W. Presz et al., "Short Efficient-Ejector Systems.," paper No. AIAA-87-1837, American Inst. of Aero. and Astro., Washington, DC, Jun. 29, 1987.

* cited by examiner

SUPERCHARGED INTERNAL COMBUSTION ENGINE

CROSS-REFERENCE TO RELATED APPLICATIONS

This application is a continuation of prior U.S. application Ser. No. 11/028,244 filed on Jan. 2, 2005 entitled SUPERCHARGED INTERNAL COMBUSTION ENGINE, which is commonly assigned, has been allowed and has issued on Jul. 18, 2006 as U.S. Pat. No. 7,076,952, the entire content of which is hereby expressly incorporated herein by reference. Applicant's related co-pending application: U.S. Ser. No. 11/389,795 filed on Mar. 27, 2006 entitled SUPERCHARGED INTERNAL COMBUSTION ENGINE.

FEDERALLY SPONSORED RESEARCH

Not Applicable

SEQUENCE LISTING OR PROGRAM

Not Applicable

FIELD OF THE INVENTION

The present invention relates to a supercharged internal combustion engine where engine intake air is pumped by an ejector pump operated by high-pressure air to boost engine output during increased power demand conditions.

BACKGROUND OF THE INVENTION

Overview: The current emphasis on fuel economy in the design of power plants for automotive application motivates the efforts to improve the performance of internal combustion engines (ICE) with relatively small displacement. It is well known that automotive vehicles with small displacement engines enjoy moderate fuel usage. However, under high torque conditions such as acceleration and grade ascent, small displacement ICE's often fail to provide satisfactory power. Yet, the conditions demanding high torque generally represent only about one tenth of a vehicle operating time.

Means for improving the performance of automotive vehicles powered by ICE include 1) engine supercharging and 2) a hybrid drive. Supercharging is a method of introducing air for combustion into combustion chambers of an ICE at a pressure in excess of that which can be obtained by natural aspiration (see, for example, McGraw-Hill Dictionary of Scientific and Technical Terms, $6^{th}$ edition, published by McGraw-Hill Companies Inc., New York, N.Y., 2003). Supercharging is accomplished with a supercharger, which is an air pump, blower or a compressor in the intake system of an ICE used to increase the weight of air charge and consequent power output from a given size engine (see, for example, the above noted McGraw-Hill Dictionary).

A hybrid drive automotive vehicle has a dual propulsion means; one driven directly by the ICE and a second one driven by a battery operated electric motor. During low torque conditions (e.g., constant speed travel on level road), the ICE has a spare power capacity that is used to operate an electric generator and store the produced electric energy in a battery. During high-torque conditions (e.g., acceleration and/or grade ascent), electric energy is extracted from the battery to power the electric motor which assists the ICE in propelling the vehicle.

Superchargers: Supercharges have long been utilized for boosting the power output of ICE's of each spark ignition and compression ignition (diesel). Superchargers can be generally classified according to their source of motive power as engine-driven and exhaust turbine-driven. The latter are also know as turbochargers. A variety of engine-driven superchargers have been developed since the early 1900's. Engine-driven superchargers with nonpositive displacement compressors (i.e., turbine-type) were developed (as disclosed, for example, by Hall-Brown in U.S. Pat. No. 1,645,178) but did not provide adequate flow at low engine speeds associated with high torque conditions. Modern engine-driven supercharger is a positive displacement pump mechanically coupled to the engine usually by means of an on/off clutch. The clutch engages the supercharger when increased engine output is desired and disengages it to reduce engine load when high ICE output is not required. Compression in a supercharger heats up the intake air, thereby reducing its density and adversely impacting ICE performance. This condition is frequently remedied by cooling the output air of a supercharger in a heat exchanger commonly known as an intercooler prior to delivery to ICE intake passage. FIG. 1 shows a typical arrangement of an ICE with an engine-driven supercharger with an intercooler supplying compressed intake air into an intake passage leading to an ICE combustion chamber.

The types of positive displacement pumps used in engine-driven superchargers include vane pumps (as disclosed, for example, by Casey et al., in U.S. Pat. No. 4,350,135), roots blowers (as disclosed, for example, by Fielden in U.S. Pat. No. 2,067,757), and screw compressors (as disclosed, for example, by Prior in U.S. Pat. No. 6,029,637). These pumps are expensive since they use precision machined and accurately aligned rotor components. Pump rotors spin at high speeds, typically in the range of 5,000 to 20,000 revolutions per minute (rpm), which leads to vibrations and wear. Abrasion and wear gradually increase the precision clearances between mating rotor components which results in reduced supercharger performance. Mitigation of this problem inspired the development of a variety of coatings aimed at reducing the consequences of rotor component wear as disclosed, for example, by Suman et al., in U.S. Pat. No. 6,688,867.

Another limitation of engine-driven superchargers is the low volumetric output at low engine speeds. This can be remedied by a variable speed drive, but only at a significant increase in complexity and cost. Engine-driven superchargers also occupy a relatively large volume which complicates their integration into engine frame. In contrast to early engine-driven superchargers that were external to the engine (as disclosed, for example, by Fielden in U.S. Pat. No. 2,067,757), modern engine-driven superchargers are typically integrated directly into the engine frame (as disclosed, for example, by Kageyama et al. in U.S. Pat. No. 6,453,890). While being more space efficient, integral supercharger obstructs other ICE components and impedes ICE serviceability. Engine-driven supercharger requires significant ICE power to operate and this power must be supplied at the least opportune moment, namely during high demand on ICE output, thus reducing ICE output power available for propulsion. Finally, an engine-driven supercharger must be engaged in a controlled manner to avoid a sudden surge in ICE intake pressure and the consequential sudden surge in output torque. This often requires a complex control system.

Another common supercharger arrangement currently in use is the turbocharger shown in FIG. 2. In a turbocharger, the ICE exhaust flow is utilized to drive an exhaust turbine, which in turn drives a compressor turbine to provide compressed air flow to the engine intake passage. Turbochargers provide the advantages of relatively smooth transition from natural aspiration to supercharged operation while utilizing residual energy of hot exhaust gas, which would otherwise be largely wasted. However, turbochargers must run at very high rotational speeds (typically on the order of 20,000 to 100,000 rpm) and use sophisticated engineered materials to withstand the high temperatures of ICE exhaust, both of which requires rather costly construction. Another disadvantage of turbochargers is a relatively long response time lag cased by the turbine inertia. Furthermore, the nature of the exhaust gas flow and the turbine drive arrangement causes the supercharging flow to increase exponentially with engine rpm. This results in relatively inadequate boost pressures at low engine speeds and excessive boost pressures at relatively high engine speed. The latter is usually mitigated by control arrangements for reducing or limiting the output flow (e.g., using flow bypassing), but it results in a more complex design.

Ejector Pumps: Ejector pumps are widely used in industry for pumping liquids and gases, see for example, R. H. Perry and C. H. Chilton, "Chemical Engineer's Handbook," $5^{th}$ edition, Chapter 6, Section "Ejectors," pages 6-29 to 6-32, published by McGraw-Hill Book Company, New York, N.Y., 1973, and G. L. Weissler and R. W. Carlson (editors), "Vacuum Physics and Technology," Chapter 4.3.5: Ejectors, pages 136 to 138, published by Academic Press, New York, N.Y., 1979. One key advantage of ejector pumps is that they have no pistons, rotors, or other moving components. FIG. 3 shows a general configuration of a gas (or steam) operated ejector pump for pumping gases. In this disclosure, the term "ejector pump" shall mean a gas-operated ejector pump. Ejector pump essentially consists of a gas-operated driving nozzle, a suction chamber and a diffuser duct. The diffuser duct typically has two sections; a mixing section which may have converging and/or straight segments, and a pressure recovery section which is usually diverging. The driving nozzle is fed a high-pressure "driving" gas (or steam) at pressure $p_1$ and converts its potential (pressure) energy into a kinetic energy thereby producing a high-velocity gas jet discharging into the suction chamber. Pumping action occurs when the gas in the suction chamber is entrained by the jet, acquires some of its velocity, and is carried into the diffuser duct where the kinetic energy of the mixture of driving and entrained gases is converted into a potential (pressure) energy. In particular, the velocity of the gas mixture is recovered inside the diffuser to a pressure $p_3$ which is greater than the suction pressure $p_2$ but lower than the driving pressure $p_1$. For stable operation the diffuser exit pressure $p_3$ must be equal or higher than the backing pressure $p_4$. Ejector design is termed subsonic if the fluid velocity in the diffuser is subsonic. Conversely, ejector design is termed supersonic if the fluid velocity in the diffuser is supersonic. Typically, diffuser ducts used in ejector pumps have a circular cross-section because it provides the largest cross-sectional area with the least circumference and, therefore, the least wall friction losses.

Ejector pumps can produce compression ratio $p_3/p_2$ of up to about 10. To achieve high compression ratio $p_3/p_2$ it is necessary that the driving gas pressure $p_1$ is much higher than the target pressure $p_3$ at the exit of the ejector, i.e., $p_1 \gg p_3$. Consequently, ejector pumps can be used as vacuum pumps or as compressors. A supersonic driving nozzle is preferably used to obtain efficient conversion of potential (pressure) energy of the driving gas into kinetic energy of the jet. Ejector pumps can be designed to accommodate a wide variety of flow conditions. As a results, ejector pumps for different applications can greatly vary in size, nozzle and duct shape, and arrangement of components. Data on commercially produced gas ejector pumps and their performance can be found, for example, in "Pumping Gases, Jet Pump Technical Data," Section 1000, Bulletin 1300, Issued March 1976 by Penberthy Division of Houdaille Industries, Inc., Prophetstown, Ill.

In a fixed ejector design, flow throughput and pressure of driving gas can be varied to produce desired discharge port pressure $p_3$ over a broad range of pumped gas inflows and pressures $p_2$. To increase ejector pump throughput beyond the capacity of a single ejector, several ejector pumps can be operated in parallel. Alternately, multiple driving nozzles can be used to feed a single large cross-section diffuser-duct (see, for example FIG. 6-71 in the above noted Perry and Chilton).

Use of Ejector Pumps in ICE: The use of ejector pumps in ICE systems has been disclosed in prior art. In particular, Ikeda et al. in U.S. Pat. No. 6,796,772 and U.S. Pat. No. 6,625,981 discloses ejector pumps driven by ICE intake air flow to generate vacuum for automotive braking system. However, these ejectors do not pump ICE intake air, do not increase the ICE intake air pressure, and do not supercharge the ICE.

Feucht in U.S. Pat. No. 6,267,106, Lundqvist in U.S. Pat. No. 6,502,397, Melchior in U.S. Pat. No. 3,996,748, Radovanovic et al., in U.S. Pat. No. 5,611,204, Gobert in U.S. Pat. No. 5,425,239 and Blake in U.S. Pat. No. 5,974,802 each disclose a fluid pump referred to as an "induction venturi," "venturi," and/or "ejector" driven by ICE intake air flow to pump exhaust ICE exhaust gases in an Exhaust Gas Recirculation (EGR) system. In all of these devices the driver gas is the intake air which flows at subsonic speeds. Therefore, the resulting compression ratio is very low albeit sufficient for EGR purposes. Furthermore, these fluid pumps do not increase the ICE intake air pressure and do not supercharge the ICE. Henderson et al. in U.S. Pat. No. 5,611,203 discloses a "multi-lobed" ejector pump operated by compressed air for pumping ERG gases into ICE air intake. This ejector pump does not increase ICE intake air pressure and does not supercharge the ICE.

Henrikson in U.S. Pat. No. 3,257,996 and Sheaffer in U.S. Pat. No. 4,461,251 each discloses an exhaust gas operated "jet pump" for inducing atmospheric air into ICE combustion chamber. These jet pumps have subsonic or sonic driving nozzles operated by puffs of hot exhaust gas generally at near ambient pressure. As a result these jet pumps are inefficient, have a low compression ratio and deliver a warm charge to ICE combustion chamber. In addition, the driver fluid (exhaust gas) becomes ingested in the engine. Increasing the throughput of such jet pump requires increasing the quantity of ingested exhaust gas, which ultimately leads to increased charge temperature and limits the ICE output. Momose et al. in U.S. Pat. No. 4,418,532 discloses a high-pressure air-operated ejector for pumping ICE exhaust gases. This ejector pump does not increase ICE intake air pressure and does not supercharge the ICE. Neuland in U.S. Pat. No. 2,297,910 and McWhorter in U.S. Pat. No. 5,975,035 each discloses a subsonic ejector-like device operated by ICE exhaust gas, which is used to create a partial vacuum for inducing air into ICE combustion chamber. Since vacuum suction rather than compression is used, this device delivers engine charge at a pressure significantly lower than ambient air pressure. In addition, an exhaust gas driven ejector pump represents an impedance to exhaust gas flow and increases the pumping work done by the ICE. Mizushina et al. in Japanese Patent Document No. JP 57210154A discloses an ejector in an ICE intake path. The ejector is operated by air supplied by a turbocharger and it is used to generate a partial vacuum to assist evaporation of fuel injected into ejector suction chamber. However, this ejector does not pump ICE intake air and does not supercharge the ICE. Arai et al. in the U.S. Pat. No. 6,082,341 discloses an ICE with a turbocharger and an eddy-flow impeller supercharger driven by ICE exhaust gases. The eddy-flow supercharger provides driving air to a converging (subsonic) ejector nozzle in the ICE intake path downstream of the turbocharger. The ejector provides only low compression and it is generally used to augment the turbocharger. Furthermore, Arai's ejector nozzle does not provide any substantial pumping or compression action during the critical ICE condition of combined low speed and high load as normally experienced at the beginning of vehicle acceleration. Suenaga et al in Japanese Patent Document No. JP 57059022A discloses an "auxiliary device" for a turbocharged ICE including an ejector located in the intake path of the turbo-compressor. The ejector has a converging (subsonic) driving nozzle which is supplied with compressed air from a storage tank. The nozzle discharges into a short duct which is placed in the ICE intake air path in such a manner so that a significant portion of the intake air bypasses the ejector nozzle and the duct by flowing on the outside of the duct. This arrangement necessarily short-circuits the ejector and limits its compression to very low values. Air flow to the Suenaga's ejector is controlled by an on/off valve. Since Suenaga does not teach means for continuous variation of air flow, engagement of the ejector is susceptible causing an ICE power surge. Said Arai and Suenaga each teaches means for augmenting a conventional turbocharger. In contrast, the instant invention teaches means and methods that allow eliminating conventional engine-drive superchargers and turbochargers from many automotive ICE.

Use of Compressed Air in ICE Combustion Chambers: Schier et al. in U.S. Pat. No. 4,538,584 discloses a diesel ICE wherein compressed air is fed from a tank into ICE cylinders for the purpose of engine starting. However, compressed air is not used for supercharging during normal ICE operation. Moyer in U.S. Pat. No. 5,529,549 discloses an ICE where engine cylinders are used to compress atmospheric air for storage in a tank and later use for engine supercharging. Kim et al. in U.S. Pat. No. 6,968,831 discloses a turbocharged ICE wherein compressed air from an air tank is supplied either to the inlet of turbocharger compressor or directly to the combustion chamber. In each Moyer's and Kim's concepts, all of the ICE intake air during supercharging is supplied from the storage tank. This means that the storage tank must have a large storage capacity, which translates to either a large volume or a high tank pressure, neither of which is desirable in an automotive vehicle. In addition, much of the potential (pressure) energy available in compressed air is wasted since the compressed air pressure is reduced to near ambient cylinder charge pressure without performing any useful work. Each Moyer and Kim fail to disclose means for delivery of stored air to ICE cylinders, a means for controlling the supercharging process such as the transition from natural aspiration to supercharging and a means for control of charge pressure. Moreover, neither Moyer or Kim shows how the air storage tank could be replenished by a compressor driven either by the ICE or an electric motor. Furthermore, neither Moyer or Kim discloses an ejector pump.

Cook in U.S. Pat. No. 3,020,901 discloses a supercharged ICE including a compressor, a reservoir and a converging nozzle. At any given time the ICE directly receives flow from the compressor. During relatively steady ICE operation air from the compressor is in-part fed to the ICE and in-part stored in the reservoir. During periods of increased demand on the engine, air from the reservoir is released through the nozzle and mixed into the output flow from the compressor to supply the ICE. Flow from the nozzle is aimed to induce greater compressor flow. One disadvantage of Cook's apparatus is that the same compressor used for full-time supercharging and to charge the reservoir. Supercharger compressors are known to be generally limited to a compression ratio of less than 2, which means that the reservoir would have to be rather large to store a significant quantity or air and impractical for automotive use. In addition, nozzle pressure ratio is very low and the converging nozzle is expected to operate in subsonic flow. This attribute combined with the absence of a diffuser for pressure recovery mean that air induction and compression by the nozzle is very limited. Michimasa in U.S. Pat. No. 5,299,547 discloses an "intake air flow increasing device" for ICE including a compressor, an air tank, pressure regulator, and an exhausting body. Compressed air is fed from the air tank through the exhausting body into ICE intake. The exhausting body is an array of nozzles configured as simple orifices capable of at most sonic flow. No diffuser is used for pressure recovery. Each of these design attributes severely limit the compression achieved by the exhausting body flow to very low values. In contrast, Applicant teaches a supersonic nozzle and a diffuser which permit increased compression of intake air.

In summary, the prior art does not teach an ICE supercharging system that is effective at the conditions of high torque and low engine speed, has a fast response, is simple, economical, can be retrofitted onto existing ICE, does not dilute engine charge with exhaust gases, and does not rob engine of power during high power demand. Furthermore, the prior art does not teach an ICE supercharged by an ejector pump driven by high-pressure air. Moreover, the prior art does not teach an ICE supercharged by an ejector pump and having an bypass duct wherein flow is regulated by a bypass valve. In addition, the prior art does not teach an ICE supercharged by an ejector pump with a supersonic driving nozzle. Moreover, the prior art fails to teach means for controlling the transition from natural aspiration to supercharging (and from supercharging back to natural aspiration) and a means for control of charge pressure in an ICE supercharged by an ejector pump. It is against this background that the significant improvements and advancements of the present invention have taken place.

SUMMARY OF THE INVENTION

The present invention provides a supercharged ICE system wherein the supercharger assembly comprises an ejector pump for pumping ICE intake air. The ejector pump is driven by high-pressure air. The ejector pump draws in air at a lower pressure and discharges air at a higher pressure into ICE intake passage for flowing into ICE combustion chamber. The supercharger assembly further includes means for regulating the flow of high-pressure air for driving the ejector pump and thereby regulating the pumping action. The supercharged ICE system further includes means for sensing ICE power demand and appropriately controlling the pumping action of the ejector pump to supercharge the ICE.

One of the central concepts of the supercharged ICE system according to the present invention applied to automotive vehicle is the recognition that under typical driving conditions the periods of high-power demand are relatively short and occur on the average only about 10% of the vehicle operating time. This means that a supercharger can be designed to operate in an intermittent mode, namely supercharging the ICE for about 10% of the vehicle operating time as demanded by vehicle driving conditions. This leaves on the average about 90% of the vehicle operating time available for recharging the supercharger.

In a first embodiment of the present invention the ICE is of the compression ignition type or fuel injected spark ignition type. The ejector pump uses a fixed throat driving nozzle for the high pressure air. An alternate driving nozzle for use with the first embodiment employs a variable area throat for regulating the mass flow of high-pressure air flowing therethrough. A variant of the first embodiment includes a compressor and an air tank for providing high-pressure air for driving the ejector pump. The compressor can be directly driven by the ICE or by an electric motor. Another variant of the first embodiment includes a by-pass duct for by-passing the ejector pump when supercharging is not desired. In a second embodiment of the present invention the ICE is of the carbureted spark ignition type. In a third embodiment the present invention the ICE is of the compression ignition type or fuel injected spark ignition type retrofitted with a supercharger assembly in accordance with the subject invention. In a fourth embodiment the present invention the ICE is of the carbureted spark ignition type retrofitted with a supercharger assembly in accordance with the subject invention. In a fifth embodiment the present invention the ICE system includes both a conventional supercharger and a supercharger assembly in accordance with the subject invention wherein the conventional supercharger provides supercharging at high engine speeds and the supercharger assembly in accordance with the subject invention provides supercharging at low engine speeds.

Accordingly, it is an object of the present invention to provide a supercharged ICE system which can generate a high volume intake air flow at high pressure during the conditions of high torque demand and relatively low engine speeds. The supercharged ICE system of the present invention is simple, lightweight, and inexpensive to manufacture to be suitable for large volume production of automotive vehicles.

It is another object of the invention to provide a supercharger assembly that has a fast response to demand conditions.

It is another object of the invention to provide a supercharger assembly that is compact and easily integrable with an ICE while not significantly impeding access to other parts of the ICE.

It is yet another object of the invention to provide a supercharger assembly that is simple, robust, economical, and has a low component count.

It is yet another object of the invention to provide a supercharger assembly that can be easily retrofitted to existing ICE.

It is still another object of the invention to provide a supercharged compression ignition ICE system.

It is still another object of the invention to provide a supercharged spark ignition ICE system.

It is still another object of the invention to obtain more power from small displacement ICE and thus providing automotive vehicles with sufficient acceleration in addition to good fuel economy.

It is a further object of the invention to provide a booster stage for a conventional supercharger (engine-driven supercharger or turbocharger) for improving ICE performance at low rpm and reducing response time.

It is still further object of the invention to provide a supercharger that can be used with hybrid vehicles to boost the power of the ICE and thus giving the hybrid vehicle more power to accelerate and ascend grade.

These and other objects of the present invention will become apparent upon a reading of the following specification and claims.

DETAILED DESCRIPTION OF THE PREFERRED EMBODIMENTS

Selected embodiments of the present invention will now be explained with reference to drawings. It will be apparent to those skilled in the art from this disclosure that the following descriptions of the embodiments of the present invention are merely exemplary in nature and are in no way intended to limit the invention, its application, or uses.

Figure 1:
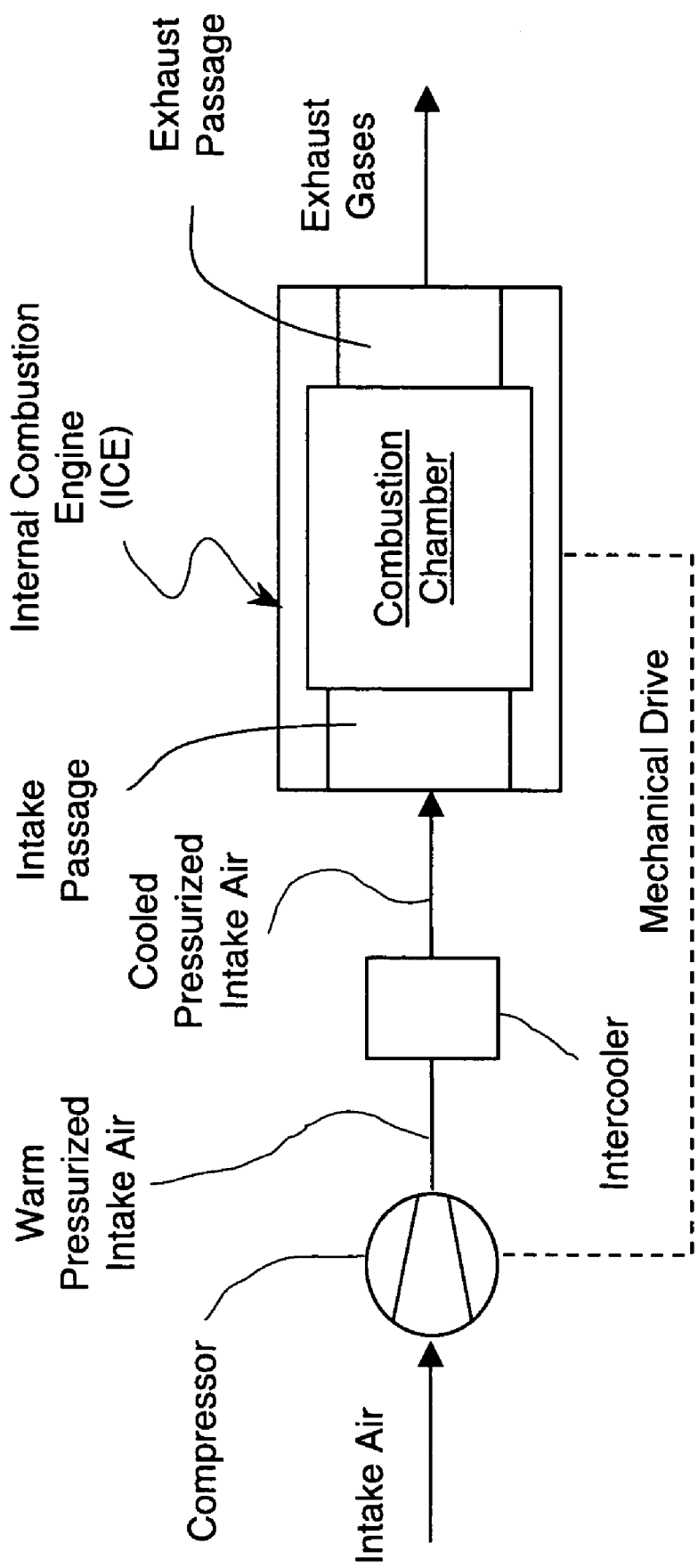
FIG. 1 is a schematic view of a supercharged ICE of prior art with an engine-driven supercharger.
Figure 2:
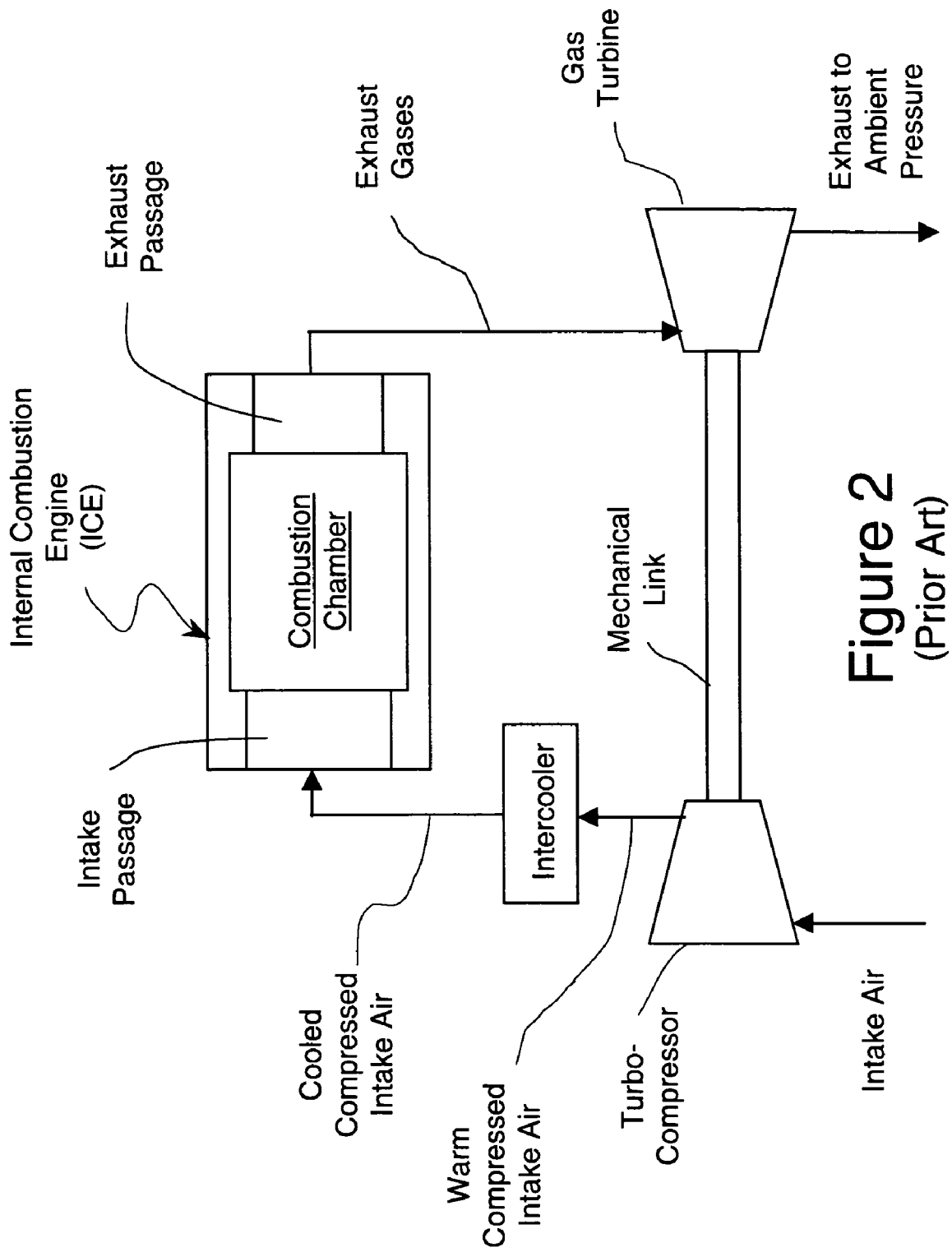
FIG. 2 is a schematic view of a supercharged ICE of prior art with a supercharger driven by an exhaust gas turbine.
Figure 3:
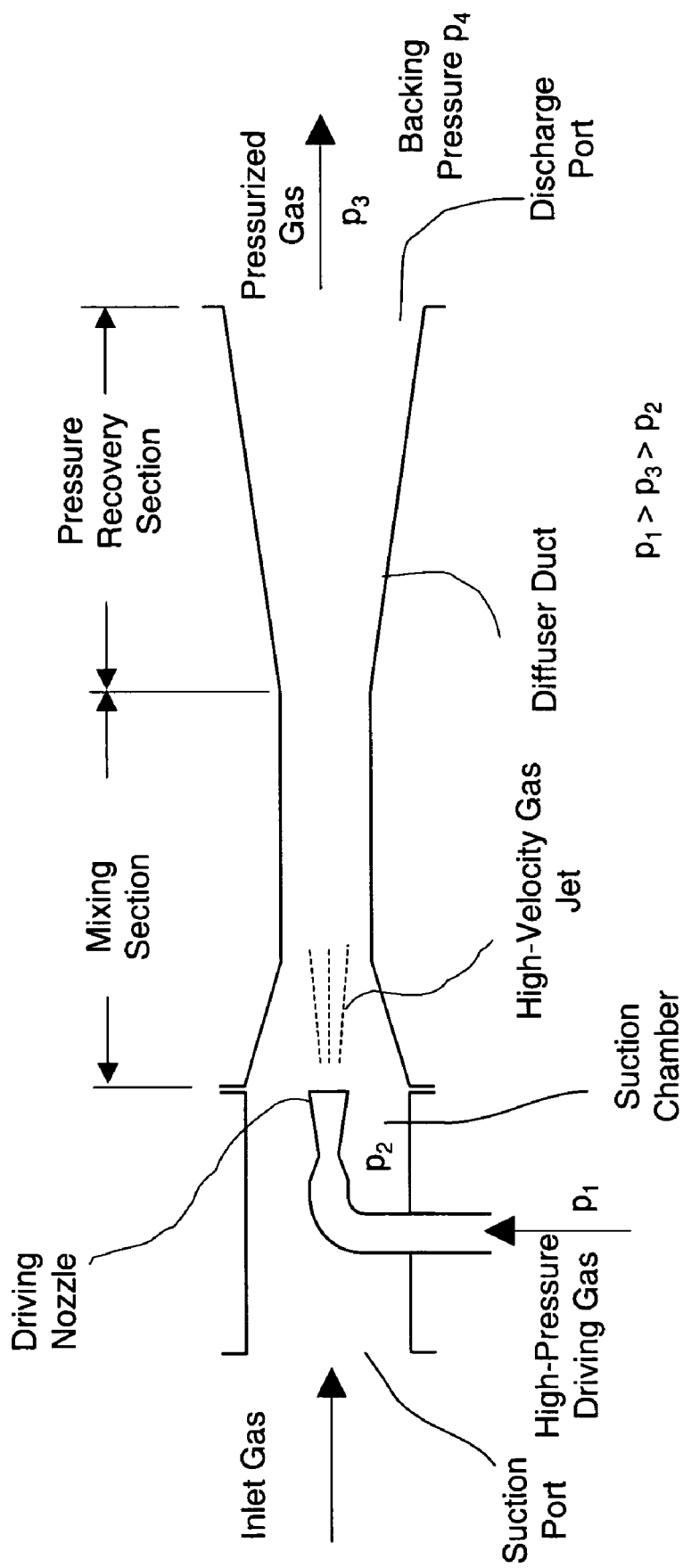
FIG. 3 is a cross-sectional diagram of an ejector pump of prior art.
Figure 4:
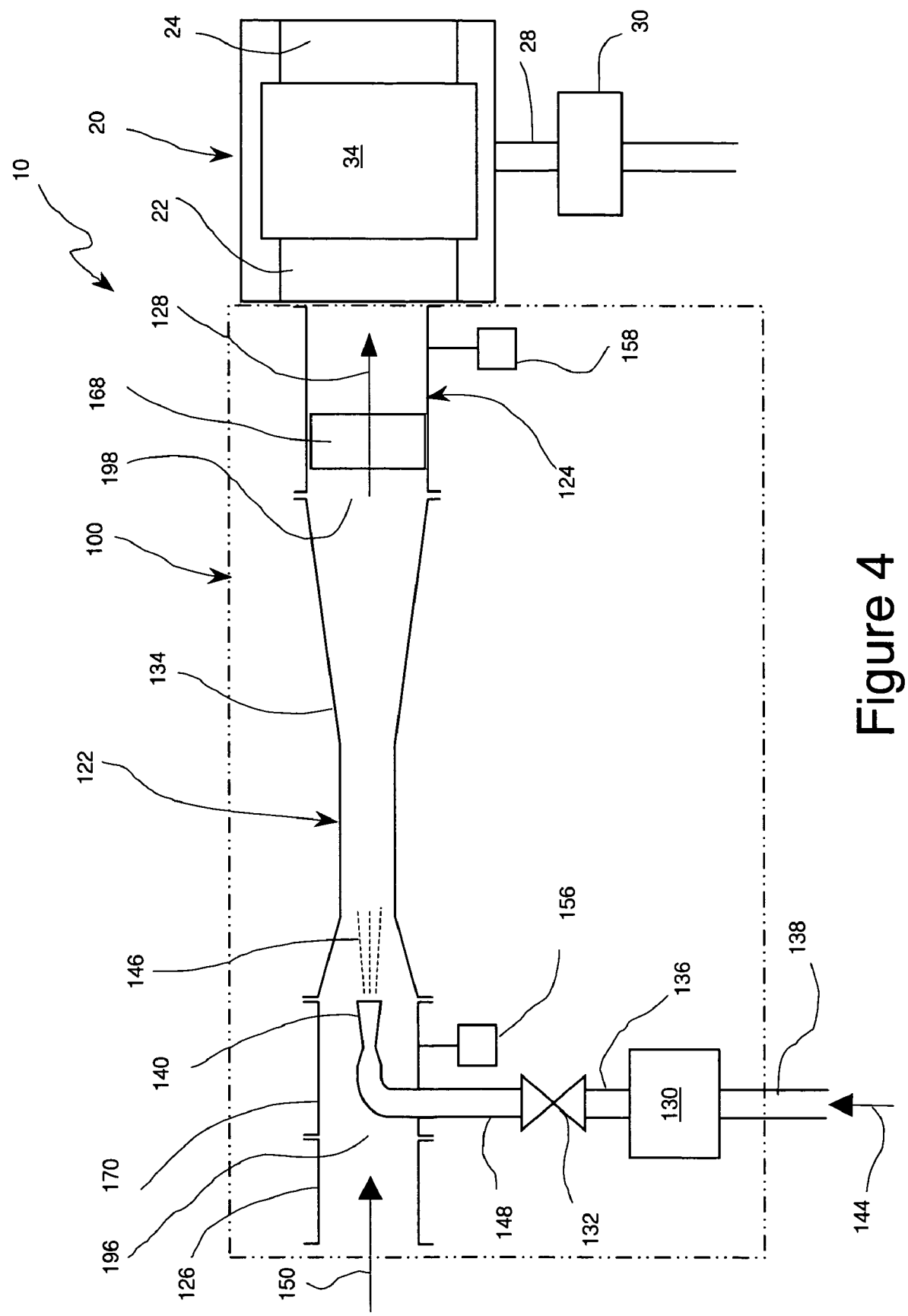
FIG. 4 is a schematic view of a supercharged ICE in accordance with a first embodiment of the subject invention.

Referring to FIG. 4 there is shown a supercharged internal combustion engine (ICE) system 10 in accordance with a first embodiment of the subject invention. The ICE system 10 comprises an ICE 20 and a supercharger assembly 100. The ICE 20 has at least one combustion chamber 34 fluidly connected to an intake passage 22 and to an exhaust passage 26. The type of ICE 20 can be either a compression ignition (diesel) or a fuel injected spark ignition. If ICE 20 is fuel injected with spark ignition, the intake passage 22 can also include a fuel injector (not shown). Furthermore, the ICE 20 can also include an output shaft 28 and a torque sensor 30 for sensing ICE output torque. The supercharger assembly 100 includes an intake duct 126, transition duct 124, an ejector pump 122, high-pressure air supply line 138, on/off valve 132, pressure regulator 130, interconnecting line 136 and air feed line 148. The ejector pump 122 further includes a driving nozzle 140, a suction chamber 170 having a suction port 196, and a diffuser duct 134 having a discharge port 198. The driving nozzle 140 is preferably of the converging-diverging type (also known as a Laval nozzle) suitable for generation of supersonic flow.

The diffuser duct 134 preferably has a circular cross-section which is known for its low wall friction losses. However, other cross-sections including oval, ellipse, square, rectangle, and polygonal shape can be also used. The diffuser duct 134 preferably has an upstream converging section, which is followed by a straight middle section that is followed by a downstream divergent section. As already noted, such a diffuser duct design is considered conventional for use with ejector pumps. However, the subject invention can be practiced with alternative diffuser designs. For example, an alternative design of the diffuser duct 134 can have only a straight section followed by a divergent section. Another alternative design of the diffuser duct 134 can have only a straight section. The preferred size and shape of the diffuser duct 134 may be determined according to a desired flow regime of the ejector pump 122.

If desirable, the transition duct 124 can also include an intercooler 168 to reduce the temperature of gas passing therethough. As noted above, use of an intercooler for cooling of intake air compressed by a supercharger is a common practice in the art. However, in the present invention, the need for an intercooler is substantially lower than in a comparable engine-driven supercharger or a turbocharger because only a portion of the gasses flowing through of the ejector pump 122 is actually compressed and, therefore, production of compression related heat is substantially lower. Preferably, the intercooler 168 is an air-water intercooler with coils and/or fins arranged lengthwise parallel to the air flow discharged by the ejector pump 122. Alternatively, an air-air intercooler can be used. The intake duct 126 is fluidly connected to a source of atmospheric air generally at near ambient pressure. For example, the inlet of the intake duct 126 can be fluidly connected to the outlet of an ICE intake air filter (not shown). The transition duct 124 is fluidly connected to the intake passage 22. The ejector pump 122, therefore, fluidly couples the intake duct 126 to the transition duct 124.

The pressure regulator 130 is fluidly connected to a source of high-pressure air by means of line 138 and to the on/off valve 132 by the line 136. High-pressure air 144 supplied in line 138 preferably has a pressure in the range of 30 to 300 psi. The pressure regulator 130 is preferably remotely controllable. Suitable pressure regulators remotely controllable either electrically, pneumatically, hydraulically, or mechanically have been disclosed in prior art and are available commercially. The on/off valve 132 is fluidly connected by the line 148 to the driving nozzle 140. The supercharger assembly 100 can further include a pressure sensor 156 for sensing the pressure in suction chamber 170 and a pressure sensor 158 for sensing the pressure in transition duct 124.

When ICE 20 operates in a naturally aspirated mode (i.e., without supercharging), the on/off valve 132 is closed. Intake air stream 150 preferably free of dust and solid particulates enters the intake duct 126, flows through the suction chamber 170 past the driving nozzle 140, through the diffuser duct 134, through the transition duct 124 and intercooler 168 therein (if used), and forms an intake air stream 128 flowing into the intake passage 22 of ICE 10. The ejector pump 122, the intake duct 126, and transition duct 124 are preferably arranged to provide low impedance to the air flowing therethrough.

When ICE 20 operates in a supercharged mode, the pressure regulator 130 receives high-pressure air 144 at pressure $p_o$ from line 138 and flows high-pressure air at a predetermined pressure $p_1$ (which is less than pressure $p_o$) into line 136. Preferably, pressure $p_1$ is at least two times the pressure $p_2$ in suction chamber 170. A preferred range for pressure $p_1$ is from about 20 to about 300 psig. The on/off valve 132 is in open position and allows the high-pressure air to flow through line 148 to the driving nozzle 140. The high-pressure air expands in the driving nozzle 140 and discharges into the suction chamber 170 of the ejector pump 122 where it forms a high-velocity jet 146 directed into the diffuser duct 134. Intake air stream 150 preferably free of dust and particulates enters through the intake duct 126 and suction port 196 into the suction chamber 170 at pressure $p_2$, where it is entrained by the high-velocity jet 146 and swept by the jet into the diffuser duct 134, thereby producing a high-velocity mixed flow. The diffuser 134 converts the kinetic energy of the mixed flow into a potential (pressure) energy, thereby producing an intake air stream 128 at pressure $p_3$. Pressure $p_3$ is substantially higher than pressure $p_2$ in suction chamber 170.

At any time during ICE operation, a control unit (not shown) of ICE system 10 preferably monitors one or more operating parameters of the system and regulates the flow rate through the driving nozzle 140 by operatively controlling the pressure regulator 130 and the on/off valve 132 according to predetermined conditions. Operating parameters monitored by the control unit preferably include engine rotational speed, engine output torque, fuel flow rate, vehicle speed, and position of accelerator pedal. Other useful parameters monitored by the control unit include ambient air pressure, intake air flow, intake air pressure, and detection values of pressure sensors 156 and 158. The ICE control unit preferably includes a microprocessor configured to receive signals from sensors in the ICE system 10, to determine whether certain predetermined conditions exist based on the measured parameters, and to output signals that regulate the mass flow through the driving nozzle 140 by operating the on/off valve 132 and pressure regulator 130 in an appropriate manner. Alternatively, various electrical, mechanical and electromechanical control mechanisms can be used to operate the valve 132 and the pressure regulator 130 in response to predetermined conditions. It will be apparent to those skilled in the art from this disclosure that the precise structure and algorithms for the control unit can be any combination of hardware and software that will carry out the functions of the present invention.

During ICE operation the suction chamber 170 is at pressure $p_2$, which could be below ambient atmospheric pressure, depending on the choice of components upstream of the intake duct 126 and the engine rotational speed. It is assumed that the pressure $p_3$ at the discharge port 198 is essentially the same as the pressure in the intake passage 22. During operation of the supercharger assembly 100, at a given combination of engine rotational speed and pressure $p_2$ in suction chamber 170, the intake passage 22 pressure $p_3$ can be regulated by varying the mass flow rate through the driving nozzle 140. Assuming that the driving nozzle 140 has a fixed throat area, its mass flow rate is substantially defined by the nozzle static pressure, which is essentially the same as the pressure $p_1$ in line 148. Consequently, the ICE charge pressure can be regulated by appropriately controlling the pressure regulator 130.

Figure 5:
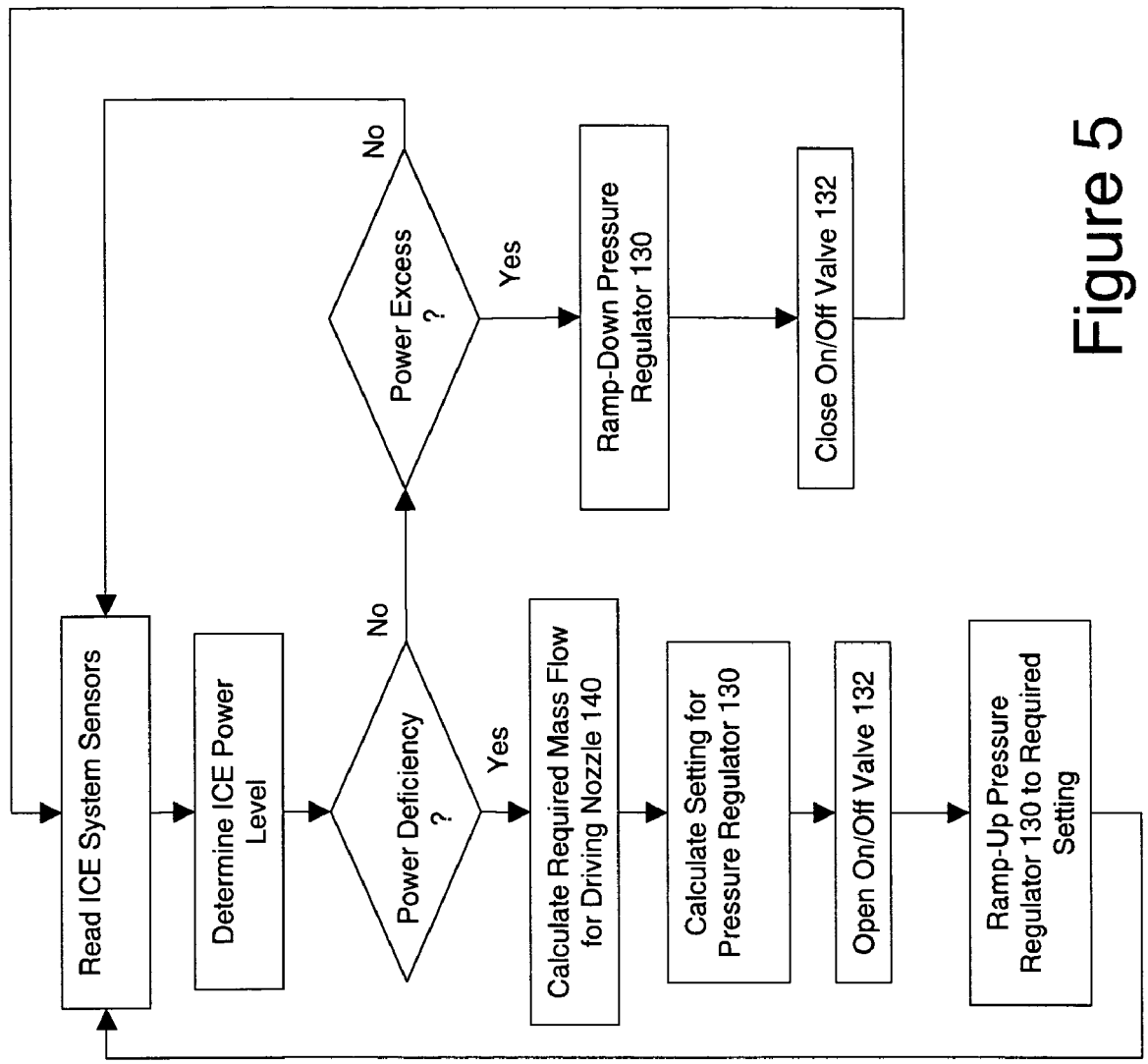
FIG. 5 is a flow charts showing preferred control operations of an electronic control unit.

FIG. 5 shows a flowchart for controlling the operation of supercharger 100. Preferably, the control unit of ICE system 10 constantly monitors engine parameters and the demand for output power. Demand for output power caused by certain ICE load conditions (e.g., due to acceleration or grade ascent) can be derived, for example, from a combination of engine rotational speed and at least one of the output torque, fuel flow rate, and the position of accelerator pedal. Preferably, power demand condition is established when engine rotational speed is less than predetermined engine rotational speed value and engine output torque is more than a predetermined engine output torque value. If the ICE system 10 cannot meet the power demand under naturally aspirated conditions, the supercharger 100 is activated by appropriately setting the output pressure $p_1$ of the pressure regulator 130 and by opening the on/off valve 132. To set the pressure regulator 130, the control unit first uses a predetermined control law of ICE 20 to calculate the pressure in intake passage 22 (which is essentially the same as $p_3$) required to satisfy the power demand at the measured engine rotational speed. This information together with a predetermined performance database of ejector pump 122 is used to determine the mass flow rate through driving nozzle 140 and the required value of pressure $p_1$. Transition from natural aspiration to supercharging can be made very smooth by gradually ramping up the mass flow rate through the driving nozzle 140. If the control unit determines that excess ICE power is produced then supercharging is discontinued by closing the on/off valve 132. Preferably, excess power condition is established when engine rotational speed is more than predetermined engine rotational speed value and engine output torque is less than a predetermined engine output torque value. In particular, the transition from supercharging to natural aspiration can be made very smooth by gradually ramping down the mass flow rate through the driving nozzle 140 before closing the on/off valve 132 by gradually reducing the output pressure $p_1$ of pressure regulator 130.

Example 1

Consider a 4-cycle ICE with a 2 liter displacement. When operating at 1200 rpm the engine displaces 20 liters per second. Assume that under naturally aspirated conditions, the intake passage pressure is about 540 Torr (about 21.25 inches Hg), which translates to an intake air flow of about 14 standard liters per second. When equipped with the supercharger assembly 100, the ICE can be supercharged and the pressure in the intake passage 22 can be increased to 680 Torr (about 27 inches Hg) by flowing approximately 10 standard liters per second of air through the driving nozzle 140 of the ejector pump 122. This may theoretically boost the ICE output by about 25%.

As noted above, operation of the ejector pump 122 is controlled by regulating the flow through the nozzle 140, which in turn is regulated by the setting of the pressure regulator 130 (FIG. 4). One disadvantage of this approach is that the pressure regulator 130 causes a pressure drop (typically about 30 psi) in the high-pressure air flow. Unless such a pressure drop is compensated by an increased pressure $p_o$ of high-pressure air 144 in supply line 138, the control range of mass flow through the driving nozzle 140 is significantly reduced. A more efficient approach to controlling a mass flow through a nozzle is to vary the nozzle throat area rather than the nozzle feed (static) pressure. Suitable nozzles with variable flow area have been disclosed in prior art for example by Friedlander et al. in the U.S. Pat. No. 6,681,560 and Bubniak et al. in the U.S. Pat. No. 4,054,621.

Figure 6:
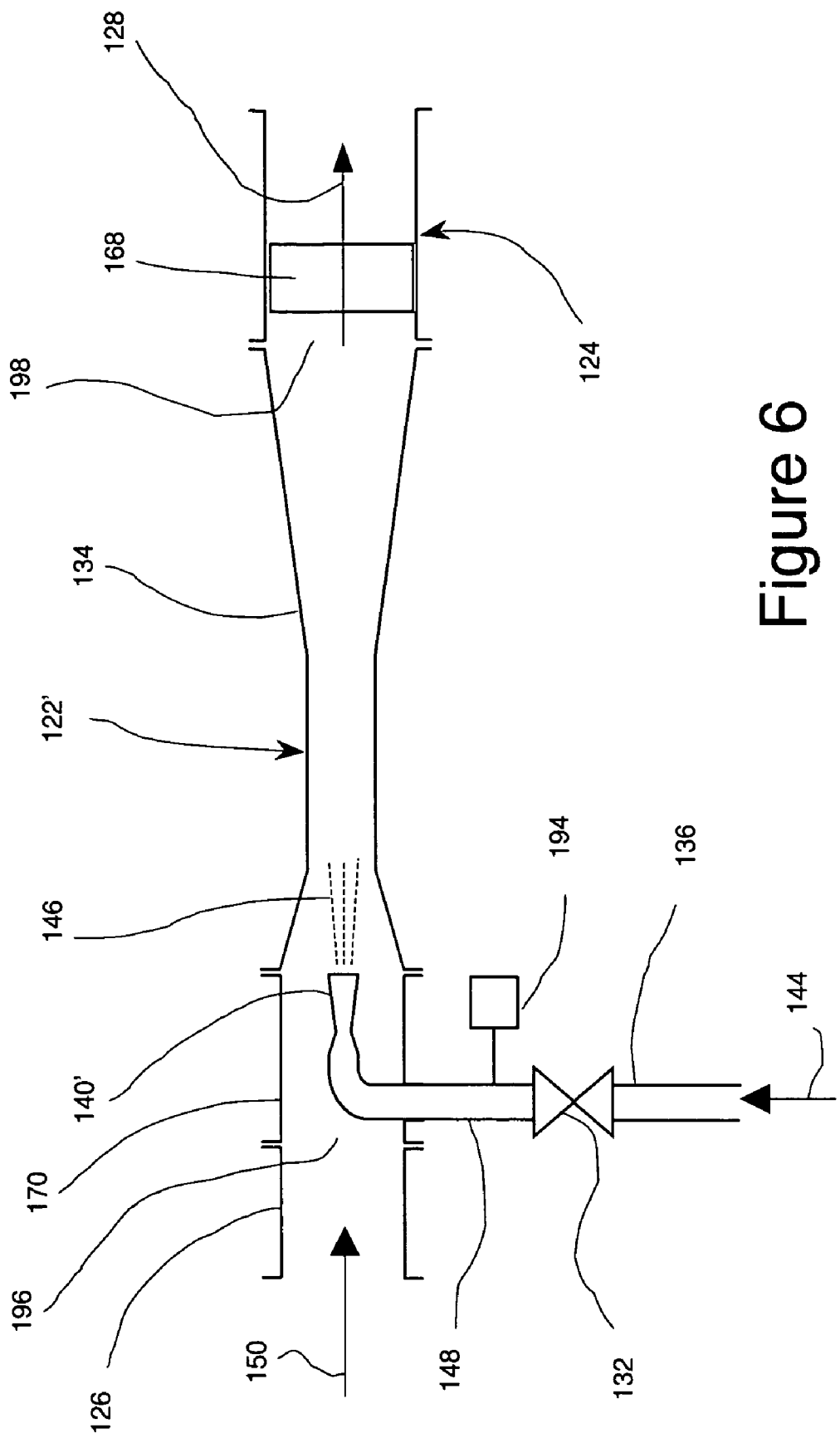
FIG. 6 is a schematic view of an alternate ejector pump with a variable area driving nozzle.

Referring now to FIG. 6, there is shown an alternative ejector pump 122' having a variable area driving nozzle 140' connected to air supply line 138 by means of an on/off valve 132 and feed line 148. During operation of the supercharger 100, the control unit obtains the value of pressure in line 148 by reading the pressure sensor 194 and sends out control signals to appropriately adjust the throat area of the driving nozzle 140' so that a predetermined mass flow rate therethrough is produced. Valve 134 is preferably chosen to have a low pressure drop at the maximum rated mass flow rate through the nozzle 144 and it is operated in already described manner as necessary to supercharge the ICE 20.

Figures 7A, 7B:
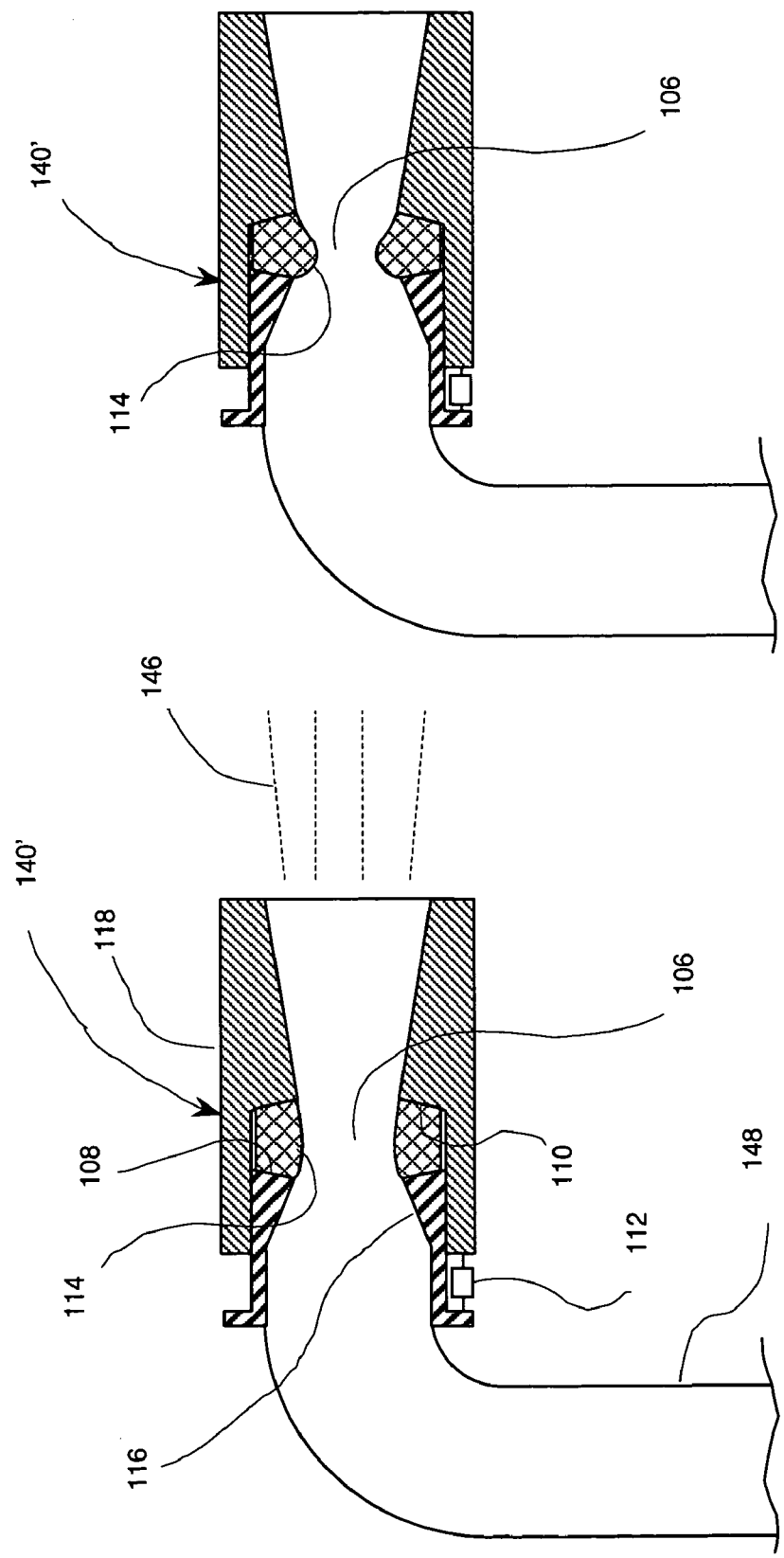
FIG. 7 is a cross-sectional view of a variable area driving nozzle.

Referring now to FIGS. 7a and 7b, there is shown a cross-sectional view of a variable area driving nozzle 140' suitable for use with the subject invention. FIG. 7a shows the driving nozzle 140' comprising a nozzle inlet 116 fluidly coupled to feed line 148, nozzle outlet 118 slidingly attached over nozzle inlet 116, elastic throat element 114, and actuator 112 adjusting the relative position of nozzle inlet 116 and nozzle outlet 118. The nozzle inlet 116 has a surface 108 and the nozzle outlet 118 has a surface 110. Surfaces 108 and 110 engage the elastic throat element 114 and compress it. The force of compression is provided by actuator 112 which slides the nozzle outlet 118 over the nozzle inlet 116. The elastic throat element 114 is made of suitable elastic material, preferably rubber or other suitable elastomer formed to a generally toroidal shape. Central opening in the elastic throat element 114 defines the nozzle throat 106. The actuator 112 can be operated mechanically, electromechanically, piezzo-electrically, hydraulically, pneumatically, or by other suitable means. One or more actuators can be used. Compression by surfaces 108 and 110 distorts the elastic throat element 114. FIG. 7b shows the elastic throat element 114 in a distorted condition and having its material forced toward the nozzle center, thereby reducing the area of nozzle throat 106. Hence, the size of nozzle throat area is controlled by the force applied by actuator 112. The driving nozzle 140' is operated by feeding high-pressure air via line 148 into the nozzle inlet 116 and through the throat 106 into the nozzle outlet 118 where it is expanded to a high velocity jet 146 (FIG. 7a).

Figure 8:
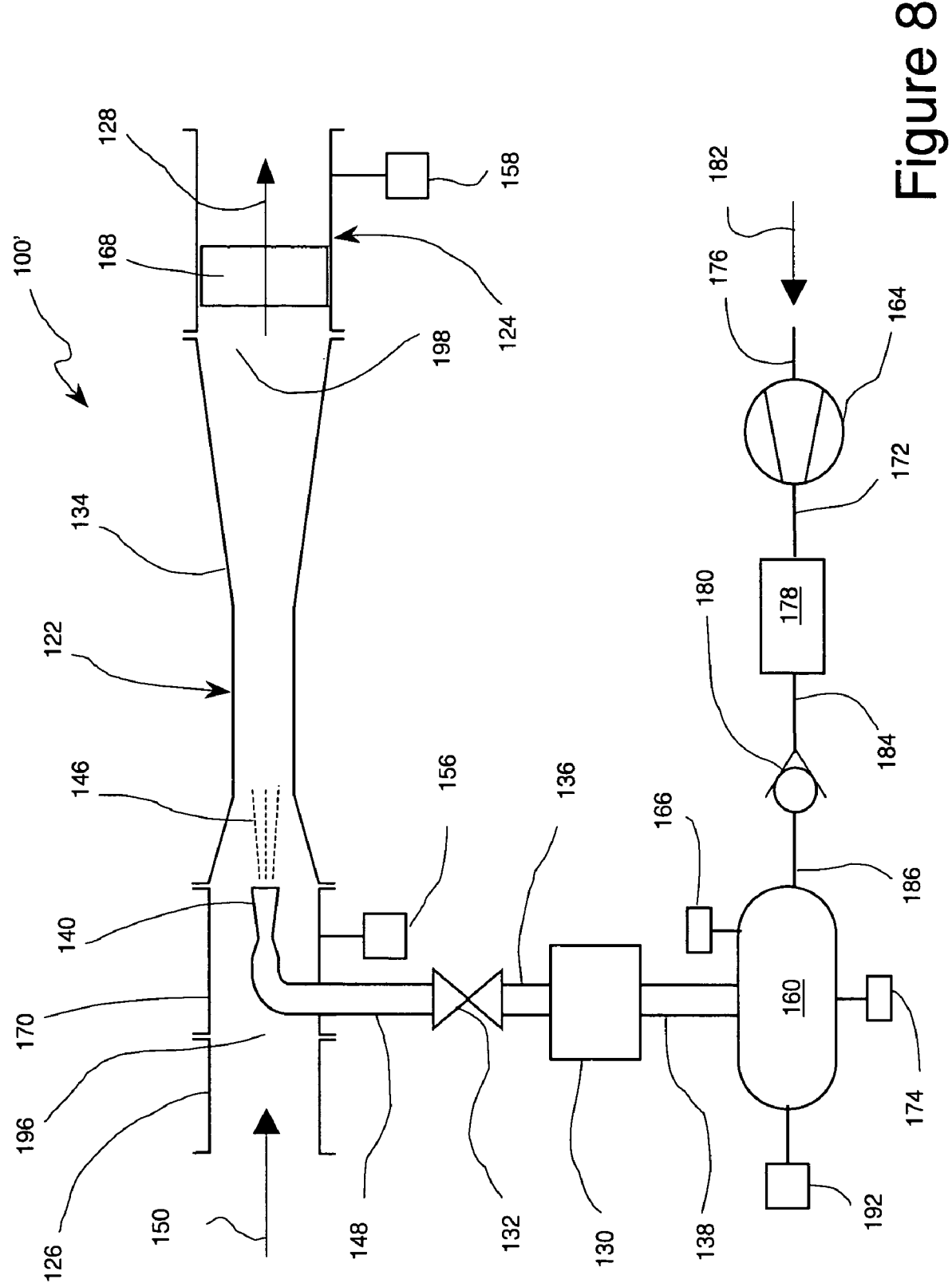
FIG. 8 is a schematic view of a supercharger assembly according to a first variant of a first embodiment of the subject invention.

The supercharger assembly 100 shown in FIG. 4 is particularly suitable for supercharging ICE in vehicles such as trucks, earth moving equipment, and utility vehicles that already have an existing supply of high-pressure air. However, smaller vehicles such as motorcycles and passenger automobiles normally do not have an existing supply of high-pressure air. To enable the use of subject invention in such applications, a supply of high-pressure air can be made an integral part of the supercharger assembly. Referring now to FIG. 8, there is shown a supercharger assembly 100' in accordance with a first variant to the supercharger assembly 100 of the first embodiment of the present invention. The supercharger assembly 100' is essentially the same as the supercharger assembly 100, except that it further includes a compressor 164, air tank 160, aftercooler 178, check valve 180 and lines 176, 172, 184, and 186.

The compressor 164 can be of any suitable type including piston, vane, scroll, or screw type. The compressor 164 is preferably driven by the ICE 20 via direct coupling or a belt drive (not shown). An on/off clutch can be included in the drive to engage the compressor on as-need basis. Alternately, compressor 164 can be driven by an electric motor. The air tank 160 is preferably equipped with a pressure switch 166 having one higher setting and one lower setting. The pressure switch 166 is wired to the controls of the compressor 164 so that the compressor 164 (and/or to the on/off clutch, if used) maintains the pressure in air tank 160 between said lower and higher settings. Such an arrangement is commonly practiced in compressor-air tank systems of prior art. The air tank 160 preferably contains an automatic drain valve 174 for automatic expulsion of water condensate that has formed inside the tank. Suitable automatic drain valves are commercially available, for example, from Wilkerson Corporation in Englewood, Colo. The aftercooler 178 is of the same general type used in conventional compressed air systems to remove the heat of compression from the air down stream of the compressor, and it can be cooled by ambient air or by ICE coolant.

Alternatively, aftercooler 178 can have a dedicated liquid coolant loop. The check valve 180 prevents a backflow of high-pressure air from the air tank 160 into the compressor when the compressor is not active.

During operation of the compressor 164, an air stream 182 at about ambient pressure and preferably free of dust and solid particulates is drawn through line 176 into the compressor 164 where it is compressed to pressure $p_o$. Output of the compressor 164 is fed through line 172 into the aftercooler 178 where the heat of compression is largely removed, and through line 184, check valve 180 and line 186 into the tank 160. Tank 160 can also include a pressure sensor 192 which can be read by the ICE control unit to determine the amount of air stored. As already noted, under average driving conditions the ejector pump draws high-pressure air from the air tank on the average only about 10% of the vehicle operating time. On the other hand, the compressor can run substantially continuously, which means that the compressor size can be relatively modest.

Example 2

Using the ICE and supercharger parameters from Example 1 with high-pressure air flow of 10 standard liters per second, the ejector pump consumes 100 standard liters in a 10 second supercharging event. Assuming that supercharging is necessary (on the average) about 10% of the vehicle operating time, the compressor has (on the average) about 100 seconds to replenish the high-pressure air in the air tank. Thus, the average flow rate through the compressor is 1 standard liter per second (about 2.3 cubic feet per minute). A suitable piston type compressor delivering high-pressure air at this flow rate would weigh about 7 kilograms (15 lbs), have a volume of about 5 liters (324 cubic inches) and require about 1 horsepower to operate. As already noted, during a supercharging event the ICE system power output would theoretically increase by about 25%.

Figure 9:
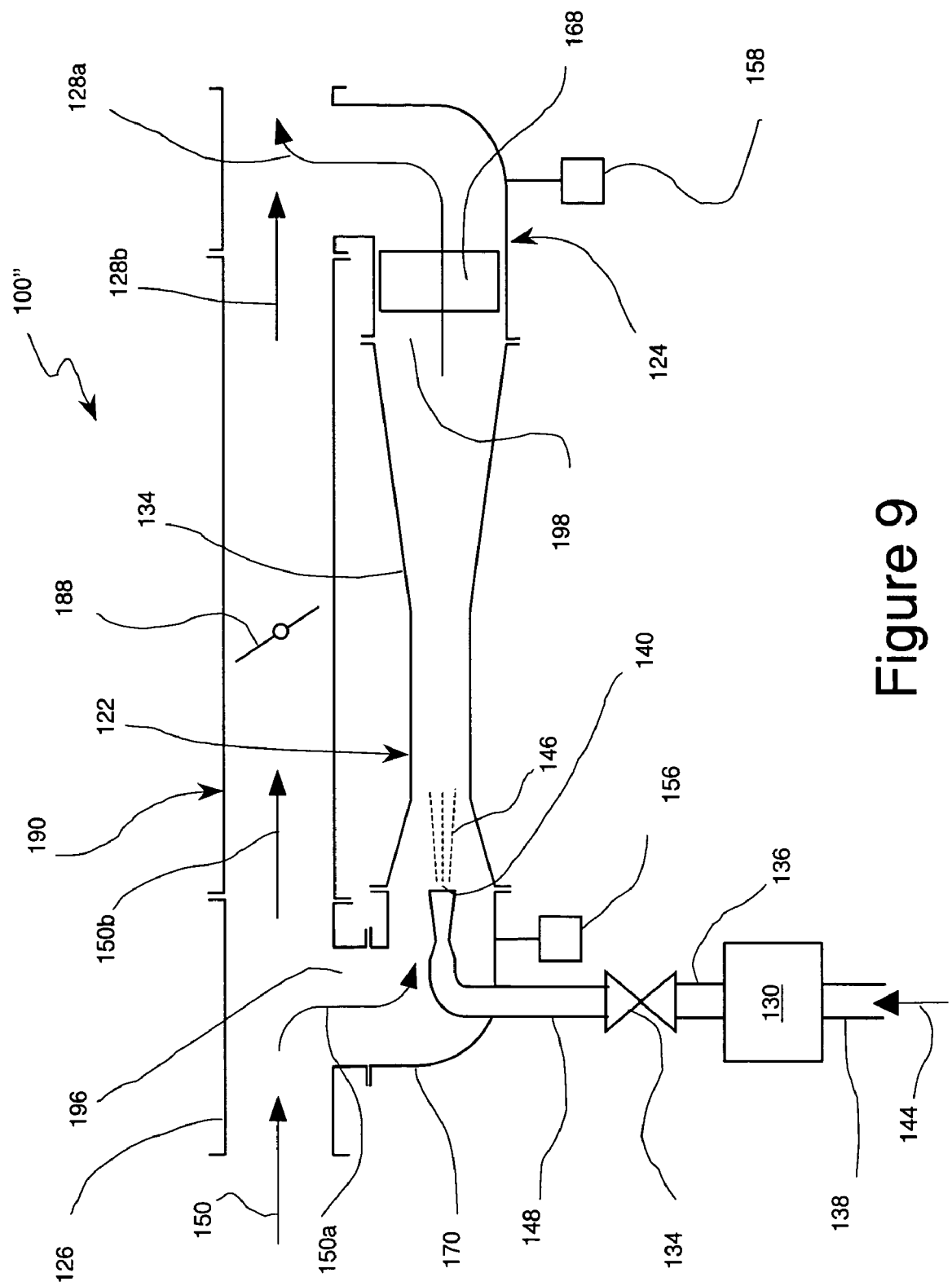
FIG. 9 is a schematic view of a supercharger assembly according to a second variant of a first embodiment of the subject invention.

Referring now to FIG. 9, there is shown a supercharger assembly 100″ in accordance with a second variant to the supercharger assembly 100 of the first embodiment of subject invention having reduced intake air flow impedance during natural aspiration. The supercharger assembly 100″ is essentially the same as supercharger assembly 100, except that it further includes a bypass duct 190. In addition, the intake duct 126′ and transition duct 124′ have been modified to allow intake air stream 150 to flow either as a stream 150a though the ejector pump 122 or as a stream 150b through the bypass duct 190. Furthermore, the bypass duct 190 includes a bypass valve 188 that prevents a back flow through the bypass duct. During naturally aspirated operation of the ICE 20, the bypass valve 188 is in open position and the ICE draws intake air stream 150 through the intake duct 126′ into the bypass duct 190, and through the transition duct 124′ into ICE intake passage (not shown). A smaller portion of the intake air flow may also pass through the ejector pump 122. During supercharging, bypass valve 188 is closed and the ejector pump 122 is operated in already described manner. Those skilled in the art will appreciate that the cross-section of the bypass duct 190 can be made arbitrarily large and thus offering low impedance to air flowing therethrough. As a result, the supercharger assembly 100″ offers significantly reduced air flow impedance under naturally aspirated ICE operation which translates to a higher ICE charge pressure. Preferably, the bypass valve 188 is formed as a check valve that closes automatically whenever the pressure in the transition duct 126′ exceeds the pressure in the intake duct 124′ by a predetermined amount. Alternatively, the bypass valve 188 is an actuated valve of a suitable type (e.g., gate valve, poppet valve, or a butterfly valve) operated by the ICE control unit. For example, the control unit can close the bypass valve 188 when the mass flow through driving nozzle 140 exceeds a predetermined mass flow value. Alternatively, the by-pass valve 188 can be arranged to close when the pressure in the intake passage 22 exceeds the pressure at the suction port 196 by a predetermined amount.

Figure 10:
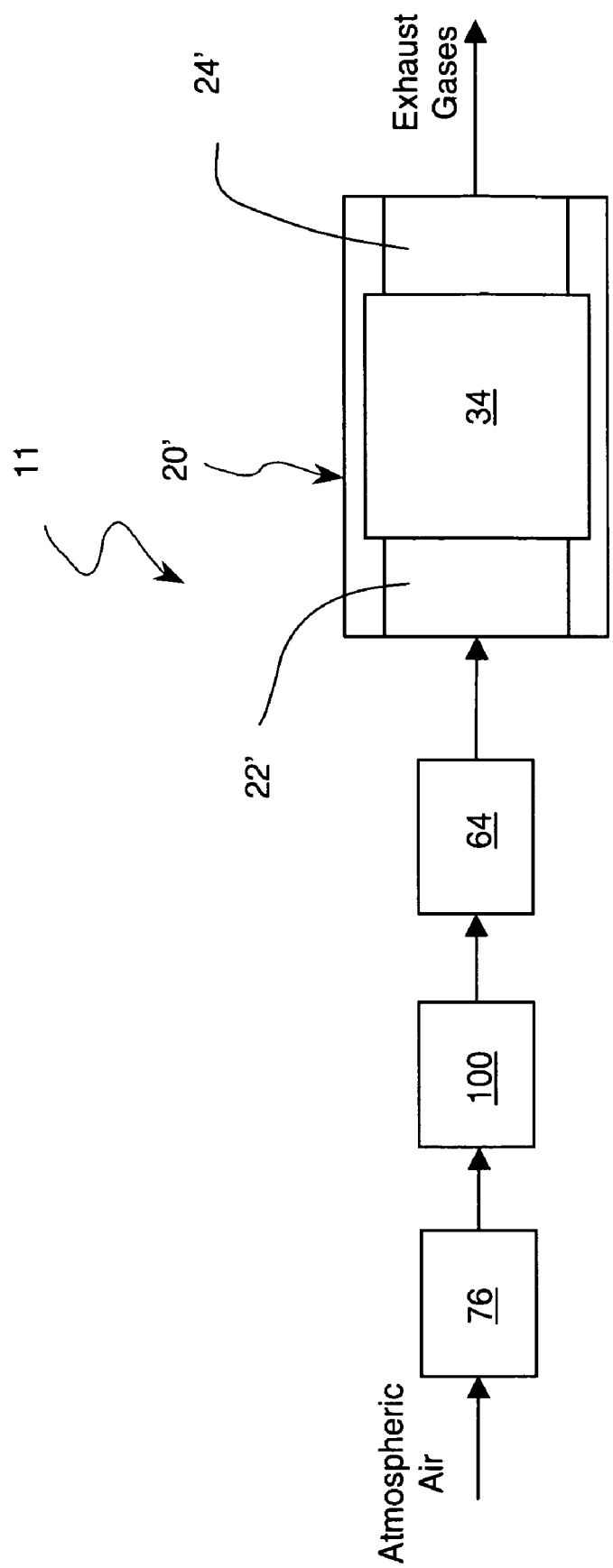
FIG. 10 is a schematic view of a supercharged carbureted ICE in accordance with a second embodiment of the subject invention.

As already stated, the ICE system 10 shown in FIG. 4 is particularly suited for compression ignition (i.e., diesel type) ICE and fuel injected spark ignition ICE. In a compression ignition ICE, fuel is injected directly into the combustion chamber of ICE 20. In a fuel injected spark ignition ICE, fuel is usually injected into the intake passage 22. In both of these ICE types, the gas flowing though the supercharger 100 (and each of its variants 100′ and 100″) is intake air. However, the supercharger assembly 100 (and each of its variants 100′ and 100″) can be also used to supercharge carbureted spark ignition engines. Referring now to FIG. 10 there is shown an ICE system 11 in accordance with a second embodiment of the present invention including a carbureted spark ignition engine 20′, carburetor 64, air filter 76, and a supercharger assembly 100. Those skilled in the art will appreciate that supercharger assembly 100 could also be also used in its first variant form 100′ or second variant form 100″. Supercharger 100 receives ambient air via air filter 76. Air discharged by the supercharger 100 is then fed into the intake passage 22′ of ICE 20′ via the carburetor 64.

Figure 11:
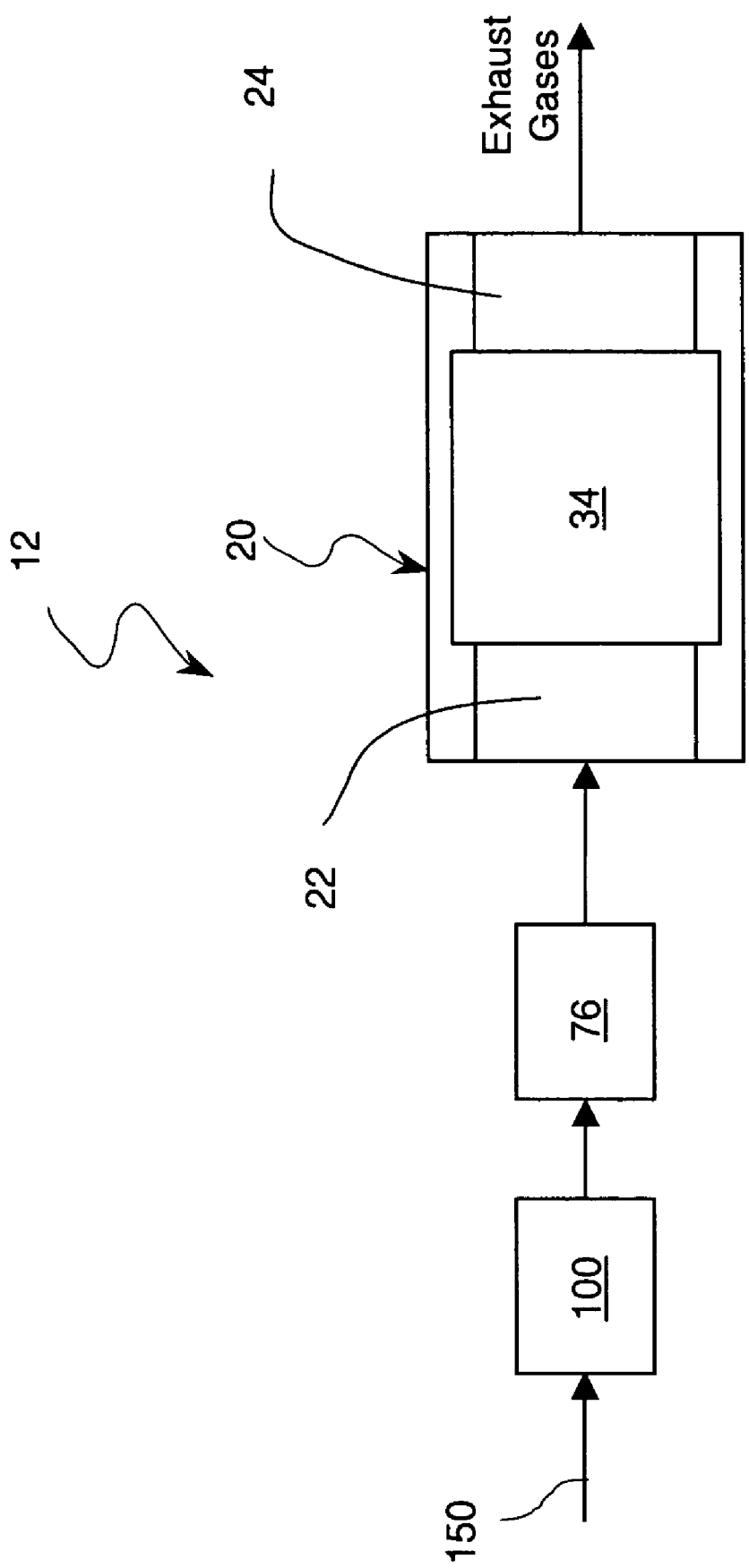
FIG. 11 is a schematic view of a supercharged ICE in accordance with a third embodiment of the subject invention having a retrofitted supercharger assembly.
Figure 12:
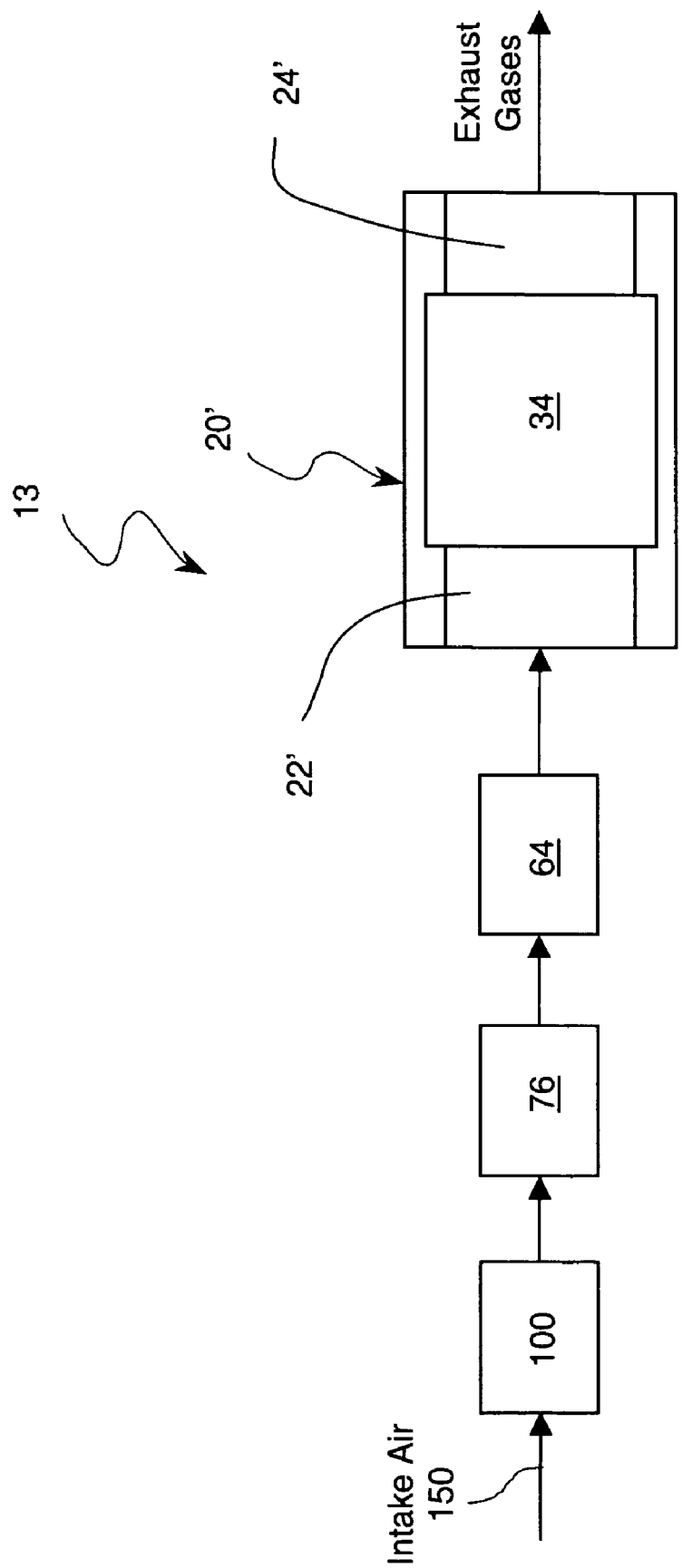
FIG. 12 is a schematic view of a supercharged carbureted ICE in accordance with a fourth embodiment of the subject invention having a retrofitted supercharger assembly.

The supercharger assembly 100 (and each of its variants 100′ and 100″) can be also used to retrofit existing compression ignition (diesel) ICE as well as carbureted and fuel injected spark ignition ICE. In particular, to retrofit an existing ICE, the supercharger 100 can be placed upstream of an existing air filter. Referring now to FIG. 11 there is shown an ICE system 12 in accordance with a third embodiment of the present invention including an ICE 20 which can be either compression ignition type or fuel injected spark ignition type, air filter 76, and a supercharger assembly 100. Intake air stream 150 is drawn into the supercharger assembly 100, is pumped by it and fed into the intake passage 22′ via air filter 76. Referring now to FIG. 12 there is shown an ICE system 13 in accordance with the fourth embodiment of the present invention including a carbureted spark ignition ICE 20′, carburetor 64, air filter 76, and a supercharger assembly 100. Intake air stream 150 is drawn into the supercharger assembly 100, is pumped by it and fed into the intake passage 22′ via air filter 76 and carburetor 64.

Figure 13:
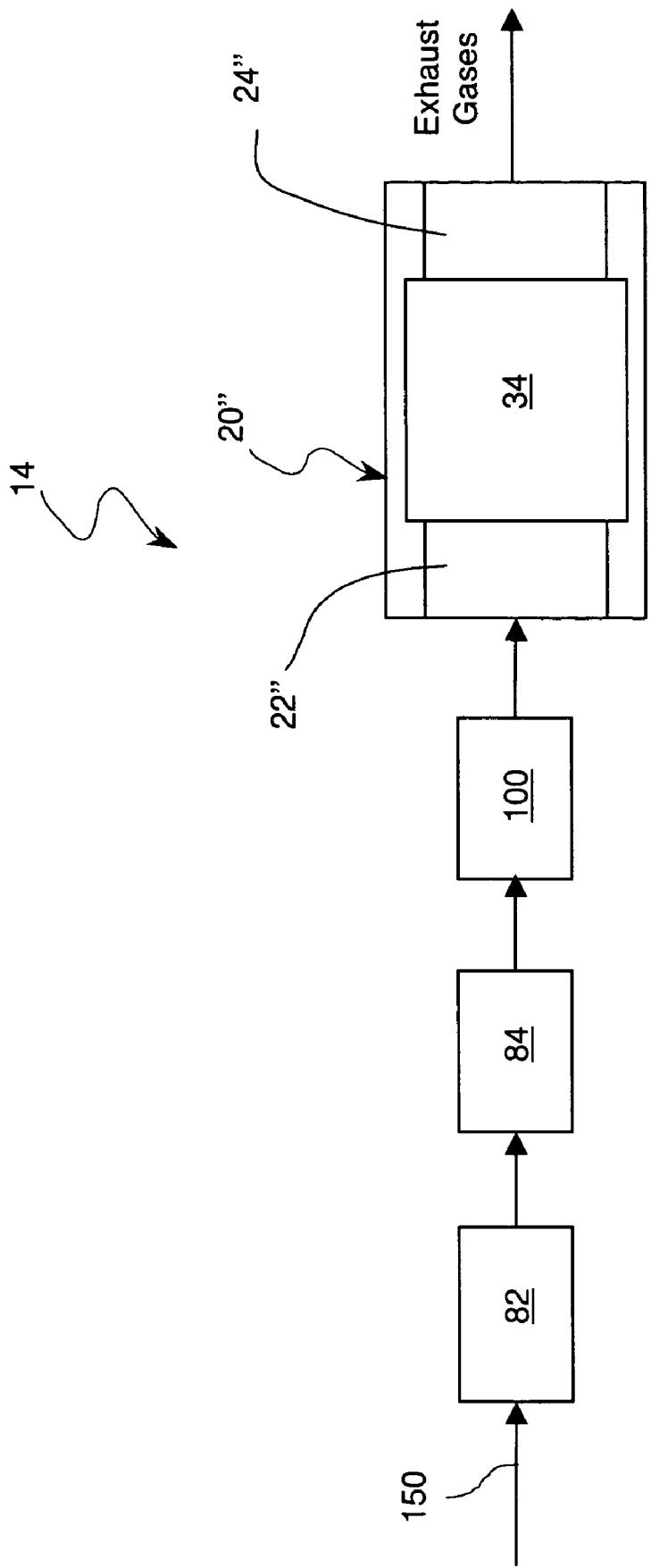
FIG. 13 is a schematic view of a supercharged ICE in accordance with a fifth embodiment of the subject invention having an supercharger assembly in addition to a conventional supercharger.

The supercharger assembly 100 (and each of its variants 100′ and 100″) can be also used with conventional engine-driven superchargers and conventional turbochargers to augment their performance at low engine speed. As already noted, during the conditions of high torque and low rotational engine speeds, a conventional supercharger alone is unable to effectively supercharge the engine. This condition can be mitigated by using the supercharger assembly 100 of the present invention to function as a booster stage for a conventional supercharger. Referring now to FIG. 13 there is shown an ICE system 14 in accordance with a fifth embodiment of the present invention comprising an ICE 20″ having an intake passage 22″ which is fed intake air by the supercharger assembly 100 which, in turn receives intake air from a conventional supercharger 82. An intercooler 84 is preferably included between the supercharger 82 and the supercharger assembly 100. The ICE 20″ can be either a compression ignition type or spark ignition type. The conventional supercharger 82 can be an engine-driven supercharger or a turbocharger. The supercharger assembly 100 can be also used in its variant form 100' or 100". Intake air 150 is compressed by the supercharger 82, cooled by the intercooler 84, and pumped by supercharger assembly 100 into the intake passage 22. If additional engine power is required during high torque and low rotational speed condition of the ICE 20", the supercharger assembly 100 is activated by flowing high-pressure air through driving nozzle 140 (FIG. 4) at a predetermined flow rate to supercharge ICE 20" for initial period of time. As the rotational speed of ICE 20" increases during this initial period, the conventional supercharger 82 gradually becomes more effective at compressing intake air, thereby reducing the need for the boosting effect provided by supercharger assembly 100. In view of this, flow rate of high-pressure air through driving nozzle 140 can be appropriately reduced and, when predetermined conditions are reached, the operation of supercharger assembly 100 is discontinued. There are numerous variants to using the subject invention with conventional engine-driven superchargers and turbochargers. For example, the supercharger 100 can be placed upstream of the conventional supercharger 82 rather than downstream as shown in FIG. 13. In another alternative embodiment of the present invention the supercharger assembly 100 is connected in parallel to the conventional supercharger 82, and control valves are used to arbitrate intake air flow depending on engine rotational speed and load conditions. In yet another alternative embodiment of the subject invention, the supercharger 82 is an ejector pump.

The advantage of using a combination of the conventional supercharger 82 and the supercharger assembly 100 is that the performance of the overall ICE system 14 is improved since the supercharger assembly 100 provides improved supercharging performance at conditions of high torque and low engine speeds (e.g., during automotive vehicle acceleration from a stopped condition), whereas the conventional supercharger 82 provides improved supercharging performance at conditions of high torque and high engine speeds, especially when such conditions last for a longer period of time (e.g., during extended grade ascent or passing).

While improvements in ICE performance are desirable, it is also important for an ICE to comply with existing emissions requirements. One way in which emissions are reduced to acceptable levels is through the use of exhaust gas recirculation (EGR) wherein a conduit connects the ICE exhaust passage 24 to the intake passage 22 to allow exhaust gas to be recycled through the combustion chamber 34 (FIG. 4). In this manner, exhaust species which are still rich in nitrogen are reintroduced to the engine, lowering $NO_x$ emissions levels by lowering flame temperature. In view of the desire for improved performance and the need for reduced emissions, it is not surprising that supercharged ICE with EGR are known in the art as, exemplified by U.S. Pat. No. 3,925,989 to Pustelnik. It is therefore desirable to use EGR with the present invention by preferably connecting the EGR between the exhaust passage 24 and the suction chamber 170 of the ejector pump 122. As a result, the EGR receives exhaust gasses from the exhaust passage 24 and conveys them to the suction chamber 170 to be pumped by the ejector pump 122 back into ICE 20.

Figure 14:
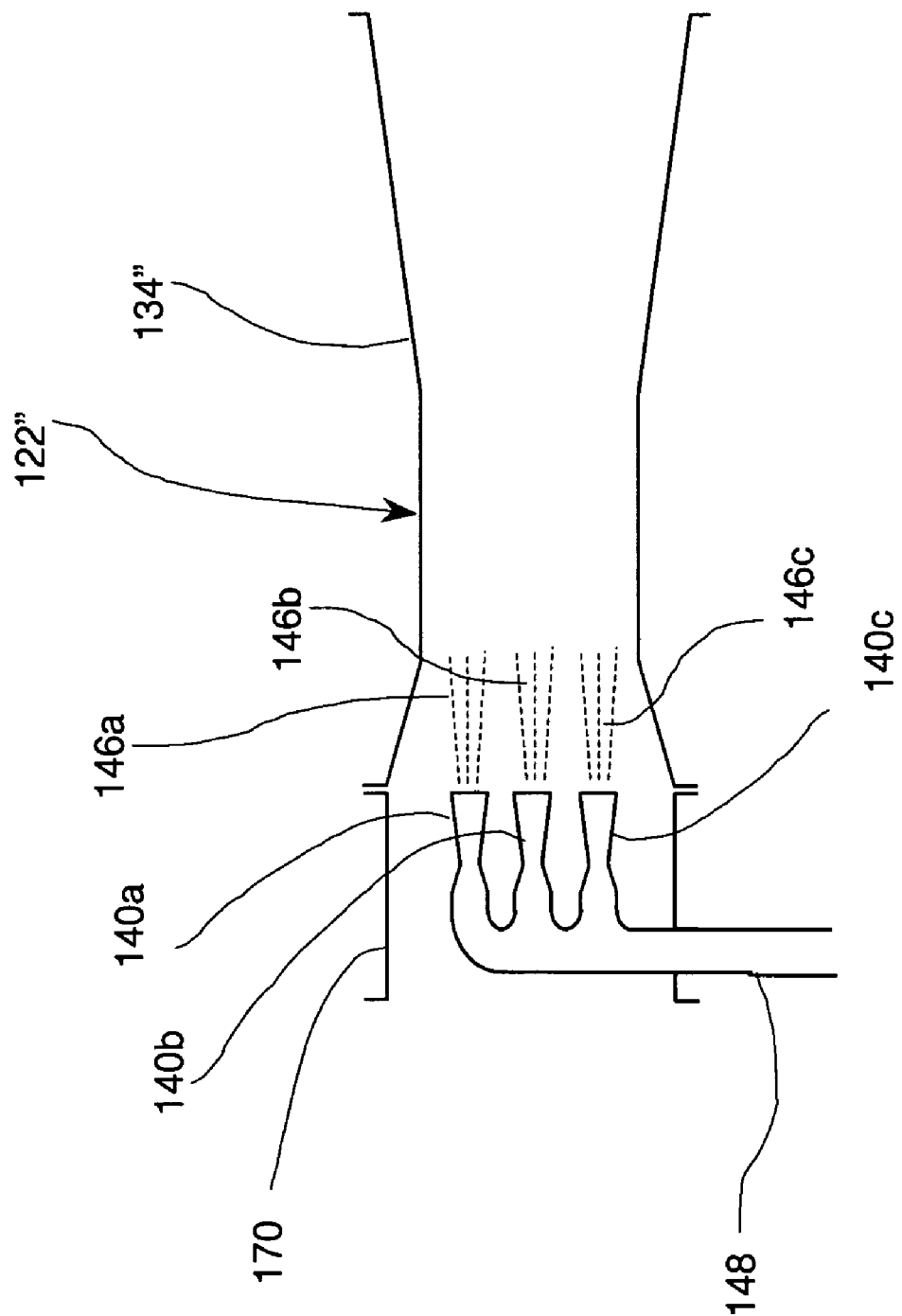
FIG. 14 is a schematic view of an alternate ejector pump with several driving nozzles injecting high-velocity jets into a single diffuser duct.

It will be appreciated that the present invention can be implemented with a variety of ICE of either reciprocating type or rotary type. The ICE can have any number of combustion chambers. Features of the various embodiments can be combined in any manner. For example, several ejector pumps 122 can be used in parallel. Alternatively, ejector pump can have multiple driving nozzles injecting high-velocity jet into a single diffuser duct. FIG. 14 shows an ejector pump 122" wherein three driving nozzles 140a, 140b, and 140c inject high-velocity jets 146a, 146b, and 146c into a single diffuser duct 134'.

The driving nozzle 140 in any of the embodiments can be either a supersonic nozzle, sonic nozzle, converging-diverging nozzle, or a subsonic nozzle as described above. The driving nozzle 140 can also formed as a lobed nozzle. Lobed nozzles are known to have improved characteristics for mixing of the high velocity jet 146 and pumped air. Suitable multi-lobed injector nozzle is described in a variety of technical publications including, for example, in "Parameter Effects on Mixer-Ejector Pumping Performance" by S. A. Skebe et al., paper number AIAA-88-0188 and in "Short Efficient Ejector Systems" by W. Pretz, Jr. et al., paper number AIAA-87-1837, both available from the American Institute of Aeronautics and Astronautics, Washington, D.C. Another suitable lobed driving nozzle used in an ejector pump with a for pumping EGR gases has been disclosed by the above mentioned Henderson et al. in the U.S. Pat. No. 5,611,203, which is hereby incorporated by reference.

A variety of conventional components can be used for construction of the present invention. Examples of suitable intercoolers 168 for use in the transition duct 124 include, without limitation, shell and tube type intercoolers and fin and plate type intercoolers. Some examples of suitable bypass valves 188 for use in the bypass duct 190 include one-way valve, check valve, poppet-type valve, and butterfly-type valve. As mentioned above, any conventional supercharger and EGR components can be used in combination with the supercharger assembly 100. The supercharger 82 can be a single stage supercharger, a compound supercharger, a series supercharger, or any other type of supercharger. The supercharger 82 can be formed as a turbocharger or an engine-driven supercharger. Suitable engine-driven superchargers include Roots pump, vane pump, and screw compressor.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Moreover, terms that are expressed as "means-plus function" in the claims should include any structure that can be utilized to carry out the function of that part of the present invention. In addition, the term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the present invention as defined in the appended claims. Furthermore, the foregoing description of the embodiments according to the present invention are provided for illustration only, and not for the purpose of limiting the present invention as defined by the appended claims and their equivalents. Thus, the scope of the present invention is not limited to the disclosed embodiments.

What is claimed is:

1. A supercharged internal combustion engine system comprising:
    an internal combustion engine (ICE), a flow control means, and an ejector pump for supercharging said ICE;
    said ICE having at least one combustion chamber and an intake passage;

said intake passage being fluidly coupled to said combustion chamber and configured for flowing intake air thereinto;
said ejector pump comprising at least one lobed driving nozzle, a suction port, and a discharge port;
said suction port being fluidly coupled to a source of intake air;
said discharge port being fluidly coupled to said intake passage;
said flow control means fluidly coupled to a source of high-pressure air;
said driving nozzle being fluidly coupled to said flow control means; and
said flow control means being configured for regulation of flow of said high-pressure air from said high-pressure air source through said driving nozzle.

2. An ICE system as in claim 1 wherein said flow control means is chosen from the group consisting of a valve, control valve, modulated poppet-type valve, proportional solenoid valve, pressure regulator, and a variable area nozzle.

3. An ICE system as in claim 1 wherein said driving nozzle is a variable area nozzle configured for regulating a mass flow rate of said high-pressure air therethrough.

4. An ICE system as in claim 1 further comprising a torque sensor for sensing output torque of said ICE.

5. An ICE system as in claim 1 further comprising a control unit operatively coupled to said flow control means for regulating mass flow rate through said driving nozzle according to operating conditions of said ICE.

6. An ICE system as in claim 5, wherein said control unit is configured to increase said mass flow rate when engine rotational speed is less than a predetermined engine rotational speed value and engine output torque is more than a predetermined engine output torque value.

7. An ICE system as in claim 5, wherein said control unit is configured to decrease said mass flow rate when engine rotational speed is more than a predetermined engine rotational speed value and engine output torque is less than a predetermined engine output torque value.

8. An ICE system as in claim 5 wherein said control unit regulates said mass flow rate through said driver nozzle according to a combination of parameters chosen from the group consisting of engine output shaft torque, engine rotational speed, intake passage pressure, fuel flow rate, vehicle speed and position of accelerator pedal.

9. An ICE system as in claim 5, wherein said control unit is configured to increase mass flow rate of said high-pressure air through said nozzle in response to demand for increase in ICE power.

10. An ICE system as in claim 5, wherein said control unit is configured to operate said flow control means so that the rate of change in ICE output power is less than a predetermined rate of change in ICE output power value.

11. A supercharged internal combustion engine system comprising:
an internal combustion engine (ICE), an ejector pump for supercharging said ICE, an ejector bypass duct, and a bypass valve;
said internal combustion engine having at least one combustion chamber and an intake passage;
said intake passage fluidly coupled to said combustion chamber and configured for flowing intake air thereinto;
said ejector pump having at least one driving nozzle, a suction port, and a discharge port;
said driving nozzle being fluidly coupled to a source of high-pressure air;
said suction port being fluidly coupled to a source of intake air;
said discharge port being fluidly coupled to said intake passage;
said ejector bypass duct having an inlet fluidly coupled to said suction port and an outlet fluidly coupled to said intake passage; and
said bypass valve configured for regulating air flow through said bypass duct.

12. An ICE system as in claim 11 wherein said bypass valve is arranged to be closed when mass flow rate of said high-pressure air through said nozzle is more than a predetermined mass flow rate value and to be open when mass flow rate of said high-pressure air through said nozzle is less than a predetermined mass flow rate value.

13. An ICE system as in claim 11 wherein said bypass valve is arranged to be closed when the difference between the air pressure in said intake passage and the air pressure at said suction port is more than a predetermined pressure value, and to be open when the difference between the air pressure at said intake passage and the air pressure at said suction port is less than a predetermined pressure value.

14. An ICE system as in claim 11 wherein said bypass valve is chosen from the group consisting of an automatic check valve, actuated valve, and butterfly valve.

15. An ICE system as in claim 11 wherein said source of intake air is chosen from the group consisting of atmospheric air, an engine-driven supercharger and a turbocharger.

16. An ICE system as in claim 11 wherein said source of high-pressure air comprises an air compressor and an air tank.

17. An ICE system as in claim 11 further comprising a flow control means for regulating mass flow rate through said driving nozzle according to according to operating conditions of said ICE.

18. A supercharged internal combustion engine system comprising:
an internal combustion engine (ICE), an ejector pump for supercharging said ICE, an air compressor, an air tank, and a flow control device;
said internal combustion engine having at least one combustion chamber and an intake passage;
said intake passage fluidly coupled to said combustion chamber and configured for flowing intake air thereinto;
said ejector pump having at least one lobed driving nozzle, a suction port, and a discharge port;
said suction port being fluidly coupled to a source of intake air;
said discharge port being fluidly coupled to said intake passage;
said air compressor having an inlet and outlet;
said air compressor inlet configured to admit atmospheric air;
said air compressor outlet fluidly coupled to said air tank;
said driving nozzle being fluidly coupled to said flow control device;
said flow control device being fluidly coupled to said air tank and receiving high-pressure air therefrom; and
said compressor being equipped with controls for maintaining the pressure of air inside said air tank within predetermined limits.

19. An ICE system as in claim 18 wherein said air compressor is chosen from the group consisting of a compressor driven by electric motor, engine driven compressor, engine driven compressor with an on/off clutch, piston compressor, positive displacement reciprocating compressor, vane compressor, scroll compressor and screw compressor.

20. An ICE system as in claim 18 wherein said source of intake air is chosen from the group consisting of atmospheric air, an engine-driven supercharger and a turbocharger.

21. An ICE system as in claim 18 wherein said suction port is fluidly coupled to an exhaust port of a supercharger chosen from the group consisting of an engine driven supercharger and turbocharger.

22. An ICE system as in claim 18 further comprising a flow control device configured for substantially smooth regulation of mass flow rate of said high-pressure air through said nozzle.

23. An ICE system as in claim 18 further comprising a supercharger disposed between said discharge port of said ejector pump and said intake passage of said ICE; said supercharger having a supercharger inlet and a supercharger outlet; said supercharger inlet connected to said discharge port of said ejector pump; said supercharger outlet connected to said intake passage of said ICE; said supercharger chosen from the group consisting of an engine-driven supercharger, turbocharger and second-stage ejector pump.

24. An ICE system as in claim 18 further comprising a control unit operatively coupled to said flow control device for regulating mass flow rate through said driving nozzle according to operating conditions of said ICE; said control unit being configured to increase mass flow rate of said high-pressure air through said nozzle in response to demand for increased ICE power.

25. An ICE system as in claim 18 further comprising an exhaust passage and an exhaust gas recirculation (EGR) conduit; said exhaust passage fluidly coupled to said combustion chamber for passing combustion products therefrom; said (EGR) conduit having an EGR inlet fluidly coupled to said exhaust passage and an EGR outlet fluidly coupled to said suction port of said ejector pump.

26. An ICE system as in claim 18 further comprising an ejector bypass duct and a bypass valve; said ejector bypass duct having an inlet fluidly coupled to said suction port and an outlet fluidly coupled to said intake passage; and said bypass valve configured for regulating air flow through said bypass duct.

27. A supercharged internal combustion engine system comprising:
an internal combustion engine (ICE), an ejector pump for supercharging said ICE, a source of high-pressure air, and flow control means;
said internal combustion engine having at least one combustion chamber, an intake passage and an exhaust passage;
said intake passage fluidly coupled to said combustion chamber and configured for flowing intake air thereinto;
said exhaust passage fluidly coupled to said combustion chamber and configured for flowing exhaust gases therefrom;
said ejector pump having a suction chamber, a lobed driving nozzle, and a diffuser duct;
said suction chamber fluidly coupled to a source of atmospheric air;
said lobed driving nozzle operated in a flow regime selected from the group consisting of subsonic flow regime and sonic flow regime;
said diffuser duct having a first end and a second end;
said first end of said diffuser duct fluidly coupled to said suction chamber;
said second end of said diffuser duct fluidly coupled to said intake passage;
said flow control means fluidly coupled to said source of high-pressure air;
said driving nozzle fluidly coupled to said flow control means,
said driving nozzle configured to direct a high velocity air jet into said first end of said diffuser duct; and
said flow control means being adapted for regulation of flow of said high-pressure air from said source of high-pressure air through said driving nozzle.

28. A supercharged internal combustion engine system as in claim 27 An ICE system as in claim 27 further comprising a control unit operatively coupled to said flow control means for regulating mass flow rate through said driving nozzle according to operating conditions of said ICE; wherein said control unit is configured to increase said mass flow rate when engine rotational speed is less than a predetermined engine rotational speed value and engine output torque is more than a predetermined engine output torque value.

29. A supercharged internal combustion engine system as in claim 27 further comprising an exhaust passage for flowing exhaust gases from said combustion chamber;
and an EGR conduit;
said EGR conduit having an EGR inlet and EGR outlet;
said EGR inlet fluidly coupled to said exhaust passage; and
said EGR outlet connected to said suction chamber for recirculation of a portion of said exhaust gases.

30. An automotive vehicle powered by a supercharged internal combustion engine comprising:
(a) an internal combustion engine (ICE) having at least one combustion chamber, an intake passage, an exhaust passage, a bypass duct and a bypass valve; said intake passage configured for flowing intake air to said combustion chamber; said exhaust passage configured for flowing combustion products from said combustion chamber; said ICE is chosen from the group consisting of a compression ignition engine, carbureted spark ignition engine, fuel injected spark ignition engine, reciprocating engine and rotary engine; said bypass duct arranged to bypass said ejector pump; said bypass valve fluidly coupled to said bypass duct; said bypass valve configured to substantially prevent a backflow through said bypass duct;
(b) an ejector pump for supercharging said ICE; said ejector pump having a driving nozzle, a suction port, and a discharge port; said ejector pump configured to receive intake air through said suction port and discharge pressurized intake air through said discharge port;
 i) said driving nozzle being fluidly coupled to a source of high-pressure air for admitting high-pressure air therefrom;
 ii) said suction port being fluidly coupled to a source of said intake air for receiving said intake air therefrom;
 said discharge port being fluidly coupled to said intake passage to discharge said pressurized intake air thereto;
(c) a means for sensing ICE power demand; and
(d) a flow control means for regulating a mass flow rate of said high-pressure air through said driving nozzle.

31. An automotive vehicle as in claim 30 wherein said automotive vehicle is a hybrid vehicle comprising an electric propulsion.

32. An automotive vehicle as in claim 30 further comprising a control unit operatively coupled to said flow control means for regulating mass flow rate through said driving nozzle based on operating conditions of said ICE to supercharge said ICE; said control unit being configured to increase said mass flow rate when engine rotational speed is less than a predetermined engine rotational speed value and engine output torque is more than a predetermined engine output torque value, and to decrease said mass flow rate when engine rotational speed is more than a predetermined engine rotational speed value and engine output torque is less than a predetermined ICE output torque value.

33. A supercharger assembly for an ICE comprising:
an ejector pump, an ejector bypass duct, a bypass valve, and a means for regulating mass flow of high-pressure air;
said ejector pump having a suction port fluidly connected to a supply of atmospheric air, a driving nozzle fluidly connected to a supply of high-pressure air and, and a discharge port fluidly connected to an intake passage of an ICE; said ejector bypass duct having an inlet fluidly coupled to said suction port and an outlet fluidly coupled to said intake passage; and said bypass valve configured for regulating air flow through said bypass duct; and said means for regulating mass flow of high-pressure air configured for regulating mass flow of said high-pressure air from said supply of high-pressure air to said nozzle.

34. A supercharger assembly as in claim 33, further comprising a control unit configured to operatively control said means for regulating mass flow of said high-pressure air; said control unit configured for sensing ICE rotational speed and at least one parameter chosen from the group consisting of accelerator pedal position, ICE fuel flow, intake passage pressure, and ICE output torque.

35. A supercharger assembly as in claim 33, wherein said means for regulating mass flow of said high-pressure air are chosen from the group consisting of a pressure regulator, flow control valve, valve, and variable area nozzle.

36. A supercharger assembly as in claim 33, further comprising an air compressor for providing said high-pressure air to said driving nozzle.

37. A supercharger assembly as in claim 36, wherein said compressor is selected for the group consisting of a piston compressor, vane compressor, scroll compressor, and screw compressor.

38. A supercharger assembly as in claim 36, wherein the source of motive power for said compressor is selected from the group consisting of said ICE and electric motor.

39. A supercharger assembly as in claim 36, wherein said high-pressure air is supplier to said driving nozzle at an absolute pressure of at least 40 pounds per square inch.

40. A supercharger assembly as in claim 33, further comprising an air tank for storing said high-pressure air.

41. A supercharger assembly as in claim 34, further comprising an air tank and a compressor; said air compressor inlet configured to admit atmospheric air and generating hi-pressure air; said high-pressure air being supplied to an air tank; said air tank being fluidly coupled to said nozzle.

42. A method for supercharging an ICE comprising the steps of:
providing an ICE having a combustion chamber;
providing an intake passage for flowing intake air into said combustion chamber;
providing an ejector pump comprising a suction port, driving nozzle, and a discharge port;
providing an ejector bypass duct having an inlet fluidly coupled to said suction port and an outlet fluidly coupled to said intake passage;
providing a bypass valve configured for regulating air flow through said bypass duct;
providing an intake air supply;
providing a high-pressure air supply;
feeding high-pressure air from said high-pressure air supply into said driving nozzle to produce pumping action in said ejector;
admitting intake air from said intake air supply into said suction port;
pumping said intake air with said ejector pump; and
feeding air discharged from said discharge port into said intake passage to supercharge said combustion chamber.

43. The method of claim 42, wherein said intake air supply is chosen from the group consisting of atmospheric air, an engine-driven supercharger and a turbocharger.

44. The method of claim 42, wherein said suction port is fluidly coupled to an exhaust port of a supercharger chosen from the group consisting of an engine-driven supercharger and a turbocharger.

45. The method of claim 42, wherein said step of pumping said intake air with said ejector pump includes maintaining said bypass valve in substantially closed position.

46. The method of claim 42, wherein said step of feeding intake air into said intake passage includes further pressurizing said intake air in a second stage supercharger.

47. The method of claim 42, wherein said step of providing high-pressure air supply includes compressing atmospheric air in a compressor.

48. The method of claim 42, wherein said step of feeding high-pressure air into said driving nozzle further includes generation of supersonic flow by said driving nozzle.

49. The method of claim 42, wherein said step of sensing ICE power demand includes reading at least one of the sensors chosen from the group consisting an ICE output shaft torque, engine speed, intake port pressure, fuel flow rate, position of accelerator pedal, and vehicle speed.

50. A supercharged internal combustion engine system comprising:
(a) an internal combustion engine (ICE) having at least one combustion chamber, and an intake passage; said intake passage configured for flowing intake air to said combustion chamber;
(b) an ejector pump for supercharging said ICE; said ejector pump having a driving nozzle, a suction port, and a discharge port; said ejector pump configured to receive intake air through said suction port and discharge pressurized intake air through said discharge port;
  (i) said driving nozzle being fluidly coupled to a source of high-pressure air for admitting high-pressure air therefrom;
  (ii) said suction port being fluidly coupled to a source of said intake air to receive said intake air therefrom;
  (iii) said discharge port being fluidly coupled to said intake passage to discharge said pressurized intake air thereto;
  (iv) said driving nozzle adapted for operation in a flow regime selected from the group consisting of a subsonic flow regime and sonic flow regime;
(c) a flow control means suitable for varying the mass flow rate of said high-pressure air through said driving nozzle; and
(d) an electronic control unit (ECU) operatively coupled to said flow control means; said ECU being configured to increase said mass flow rate when rotational speed of said engine is less than a predetermined engine rotational speed value and output torque of said engine is more than a predetermined engine output torque value, and to decrease said mass flow rate when rotational speed of said engine is more than a predetermined engine rotational speed value and output torque of said engine is less than a predetermined engine output torque value.

* * * * *